US012266242B2

(12) United States Patent
Thomas et al.

(10) Patent No.: US 12,266,242 B2
(45) **Date of Patent: *Apr. 1, 2025**

(54) DYNAMIC MULTIPLAYER GAMING PLATFORM

(71) Applicant: Aristocrat Technologies, Inc., Las Vegas, NV (US)

(72) Inventors: Alfred Thomas, Venutra, CA (US); Joseph Masinter, II, Las Vegas, NV (US)

(73) Assignee: Aristocrat Technologies, Inc., Las Vegas, NV (US)

( * ) Notice: Subject to any disclaimer, the term of this patent is extended or adjusted under 35 U.S.C. 154(b) by 141 days.

This patent is subject to a terminal disclaimer.

(21) Appl. No.: 18/058,164

(22) Filed: Nov. 22, 2022

(65) Prior Publication Data

US 2023/0077588 A1 Mar. 16, 2023

Related U.S. Application Data

(63) Continuation of application No. 16/896,952, filed on Jun. 9, 2020, now Pat. No. 11,521,465.

(Continued)

(51) Int. Cl.
*G07F 17/32* (2006.01)
*G07F 17/34* (2006.01)

(52) U.S. Cl.
CPC ...... *G07F 17/3272* (2013.01); *G07F 17/3213* (2013.01); *G07F 17/3267* (2013.01); *G07F 17/34* (2013.01)

(58) Field of Classification Search
CPC ............. G07F 17/3211; G07F 17/3204; G07F 17/3272; G07F 17/3227; G07F 17/34;
(Continued)

(56) References Cited

U.S. PATENT DOCUMENTS 5,611,174 A 3/1997 Hayashi
5,772,311 A 6/1998 Williams
(Continued)

OTHER PUBLICATIONS

Office Action (Non-Final Rejection) dated Mar. 28, 2023 for U.S. Appl. No. 17/701,424 (pp. 1-5).
(Continued)

*Primary Examiner* — Justin L Myhr
(74) *Attorney, Agent, or Firm* — Armstrong Teasdale LLP

(57) ABSTRACT

Systems, methods, and computer readable media for providing a multiplayer game to players of a plurality of electronic gaming machines are described. When executed by a at least one processor, stored instructions cause the at least one processor to (i) cause to be displayed, on a multiplayer game display, a group metamorphic game element configured to interact with each of the plurality of electronic gaming machines, (ii) activate, during a first game play on a first electronic gaming machine, a multiplayer feature, (iii) cause the group metamorphic game element to transition one of the communal game elements from the multiplayer game display to an individual metamorphic game element associated with the first electronic gaming machine, and (iv) based on the transitioned communal game element, apply the activated multiplayer feature to a first game play on the first electronic gaming machine.

18 Claims, 20 Drawing Sheets

Related U.S. Application Data

(60) Provisional application No. 62/913,350, filed on Oct. 10, 2019, provisional application No. 62/869,452, filed on Jul. 1, 2019.

(58) Field of Classification Search
CPC ............. G07F 17/3213; G07F 17/3223; G07F 17/3237; G07F 17/3244; G07F 17/3258; G07F 17/3267; G07F 17/3281
See application file for complete search history.

(56) References Cited

U.S. PATENT DOCUMENTS

| | | | | |
|---|---|---|---|---|
| D618,682 | S | 6/2010 | Haase | |
| D646,336 | S | 10/2011 | Kelly | |
| D673,203 | S | 12/2012 | Jacques | |
| 8,922,531 | B2 | 12/2014 | Lee | |
| 8,979,303 | B2 | 3/2015 | Adams | |
| D744,579 | S | 12/2015 | Cope | |
| D747,718 | S | 1/2016 | Drabant | |
| RE46,169 | E | 10/2016 | Kelly | |
| D770,406 | S | 11/2016 | Fleming, Jr. | |
| D786,242 | S | 5/2017 | Ho | |
| 9,677,288 | B2 | 6/2017 | Peck | |
| D796,700 | S | 9/2017 | Walter | |
| D808,964 | S | 1/2018 | Asamizu | |
| D823,856 | S | 7/2018 | Asamizu | |
| D842,932 | S | 3/2019 | Stair | |
| D842,933 | S | 3/2019 | Castro | |
| D843,480 | S | 3/2019 | Castro | |
| D843,482 | S | 3/2019 | Holland | |
| D850,536 | S | 6/2019 | Stair | |
| D850,537 | S | 6/2019 | Urban | |
| D863,441 | S | 10/2019 | Hwang | |
| D876,543 | S | 2/2020 | Kim | |
| D898,225 | S | 10/2020 | Rossborough, Jr. | |
| D916,969 | S | 4/2021 | Fleming, Jr. | |
| D954,829 | S | 6/2022 | Olive | |
| 2003/0151562 | A1 | 8/2003 | Kulas | |
| 2004/0048646 | A1 | 3/2004 | Martin | |
| 2004/0204235 | A1 | 10/2004 | Walker | |
| 2005/0003880 | A1 | 1/2005 | Englman | |
| 2007/0263081 | A1 | 11/2007 | De Beer | |
| 2008/0002161 | A1 | 1/2008 | Streid | |
| 2008/0020823 | A1 | 1/2008 | Cuddy | |
| 2008/0045320 | A1 | 2/2008 | Kato | |
| 2008/0207308 | A1 | 8/2008 | Yoshizawa | |
| 2009/0011824 | A1* | 1/2009 | Englman | G07F 17/3276 463/16 |
| 2010/0016065 | A1* | 1/2010 | Nicely | G07F 17/3244 463/25 |
| 2011/0034239 | A1 | 2/2011 | Collette | |
| 2011/0092271 | A1 | 4/2011 | Nguyen | |
| 2012/0252562 | A1 | 10/2012 | Aoki | |
| 2013/0184078 | A1 | 7/2013 | Brunell | |
| 2013/0274016 | A1 | 10/2013 | Gagner | |
| 2013/0321740 | A1 | 12/2013 | An | |
| 2014/0206432 | A1 | 7/2014 | Radek | |
| 2014/0333507 | A1 | 11/2014 | Welck | |
| 2015/0018070 | A1 | 1/2015 | Meyer | |
| 2015/0168792 | A1 | 6/2015 | Woo | |
| 2017/0169654 | A1 | 6/2017 | Sue | |
| 2018/0082523 | A1 | 3/2018 | Palermo | |

OTHER PUBLICATIONS

Office Action dated Mar. 24, 2023 for U.S. Appl. No. 29/698,539 (pp. 1-7).
Notice of Allowance dated Mar. 27, 2023 for U.S. Appl. No. 29/698,543 (pp. 1-10).
Office Action (Notice of Allowance and Fees Due (PTOL-85)) dated Apr. 12, 2023 for U.S. Appl. No. 17/701,424 (pp. 1-7).
Notice of Allowance dated Apr. 12, 2023 for U.S. Appl. No. 17/701,424 (pp. 1-7).
Ngapleaz, Manchester Airport terminal 2, en.wikipedia.org/wiki/File:Manchester_airport_terminal_2jpg, Jun. 1, 2016.
Clubit, LG OLED TV Tunnel at CES 2017, www.youtube.com/watch?v=Ar1JF-Acr-o, Jan. 17, 2017.
LG Newsroom, World's Largest OLED Tunnel Welcomes Visitors to IFA With 450 Million Brilliant Pixels, wwwlgnewsroom.com/2016/09/worids-largest-oled-tunnel-welcomes-visitors-to-ifa-with-450-Tiillion-brilliant-pixels/, Sep. 1, 2016.
Fremont Street Experience, Viva Vision Light Shows at Fremont Street Experience, www.youtube.com/watch?v=cddjEysQ-Fc, Aug. 8, 2016.
Cooper, J., Bude Tunnel's bizarre but beautiful Christmas spectacle finishes today, www.cornwalllive.com/news/cornwall-news/bude-tunnels-bizarre-beautiful-christmas-2333084, Dec. 16, 2018.
Beyman, Alex., "Gundam Battle Pods: Japanese Arcades are INSANE," https://medium.com/future-vision/gundam-battle-pods-japanese-arcades-are-insane-9b89d88b291, May 20, 2019, 6 pages.
Eclipse PhotoBooth, Digital Centre, https://www.youtube.com/watch?v=YMNigd4Kz21, Nov. 14, 2016.
Dodd, Bill., "Dome Gaming Build," http:/arcadeshenanigans.com/blog/2015/10/1/dome-gaming-build, Oct. 1, 2015, 45 pages.
Walking tour of Fremont Street at Night in Downtown Las Vegas Travel Guide, Wind Walk Travel Videos, https://www.youtube.com/watch?v=O05J_EE7cMs, Jun. 30, 2018.
Yin, Lana., Led display time tunnel . . . led display factory can make it for you, https://www.youtube.com/watch?v=W7O9OOz90-w, Dec. 27, 2017.
Cristino, Nuno., "OLED tunnel: artistic space beyond display and imagination," LG Magazine, https://www.lg.com/uk/lg-magazine/what-is-new/lg-oled-tunnel-artistic-space-beyond-display-and-imagination, Feb. 9, 2017, 5 pages.
Tarosky, Matt., "Tunnels," BRDG Studios, https://brdg.co/tunnels/, Aug. 31, 2016, 33 pages.
Haynes, Dave., "LED Tunnel Creates Immersive Experience For MLB All-Star Fans," Sixteen-Nine, https://www.sixteen-nine.net/2017/09/22/led-tunnel-creates-immersive-experience-for-mlb-all-star-fans/, Sep. 22, 2017, 7 pages.
Office Action dated Jul. 1, 2021 for U.S. Appl. No. 16/896,952 (pp. 1-18).
Office Action (Final Rejection) dated Nov. 24, 2021 for U.S. Appl. No. 16/896,952 (pp. 1-18).
Office Action (Notice of Allowance and Fees Due (PTOL-85)) dated Jan. 5, 2022 for U.S. Appl. No. 16/890,634 (pp. 1-8).
Office Action (Non-Final Rejection) dated Mar. 2, 2022 for U.S. Appl. No. 16/896,952 (pp. 1-21).
Office Action (Notice of Allowance and Fees Due (PTOL-85)) dated Aug. 1, 2022 for U.S. Appl. No. 16/896,952 (pp. 1-8).
Office Action dated Mar. 25, 2024 for U.S. Appl. No. 18/350,529 (pp. 1-10).
Office Action (Notice of Allowance and Fees Due (PTOL-85)) dated Jul. 22, 2024 for U.S. Appl. No. 18/350,529 (pp. 1-7).

* cited by examiner

1200

1250 1252 1254

DYNAMIC MULTIPLAYER GAMING PLATFORM

CROSS REFERENCE TO RELATED APPLICATIONS

This application is a continuation of U.S. patent application Ser. No. 16/896,952, filed Jun. 9, 2020, entitled "DYNAMIC MULTIPLAYER GAMING PLATFORM," which claims priority to U.S. Provisional Patent Application No. 62/913,350, filed Oct. 10, 2019, entitled "DYNAMIC MULTIPLAYER GAMING PLATFORM," and to U.S. Provisional Patent Application No. 62/869,452, filed Jul. 1, 2019, entitled "ELECTRONIC GAMING MACHINE ARCHWAYS INCLUDING PLURALITIES OF CURVED DISPLAY DEVICES," the contents of both which are hereby incorporated by reference in their entirety.

TECHNICAL FIELD

The field of disclosure relates generally to electronic gaming, and more particularly, to a dynamic multiplayer gaming platform. The dynamic multiplayer gaming platform can be implemented on one or more electronic gaming machine archways that include one or more electronic gaming machines, each archway including and formed from a plurality of curved display devices.

BACKGROUND

Electronic gaming machines (EGMs), or gaming devices, provide a variety of wagering games such as, for example, and without limitation, slot games, video poker games, video blackjack games, roulette games, video bingo games, keno games, and other types of games that are frequently offered at casinos and other locations. Play on EGMs typically involves a player establishing a credit balance by inserting or otherwise submitting money, or another form of monetary credit, and placing a monetary wager (deducted from the credit balance) on one or more outcomes of an instance (or single play) of a primary or base game. In some games, a player may qualify for a special mode of the base game, a secondary game, or a bonus round of the base game by attaining a certain winning combination or triggering event in, or related to, the base game, or after the player is randomly awarded the special mode, secondary game, or bonus round. In the special mode, secondary game, or bonus round, the player is given an opportunity to win extra game, credits, game tokens or other forms of payout. In the case of "game credits" that are awarded during play, the game credits are typically added to a credit meter total of the EGM and can be provided to the player upon completion of a gaming session or when the player wants to "cash out."

"Slot" type games are often displayed to the player in the form of various symbols arrayed in a row-by-column grid or matrix. Specific matching combinations of symbols along predetermined paths (or paylines) through the matrix indicate the outcome of the game. The display typically highlights winning combinations/outcomes for identification by the player. Matching combinations and their corresponding awards are usually shown in a "pay-table" which is available to the player for reference. Often, the player may vary his/her wager to included differing numbers of paylines and/or the amount bet on each line. By varying the wager, the player may sometimes alter the frequency or number of winning combinations, frequency or number of secondary games, and/or the amount awarded.

Typical games use a random number generator (RNG) to randomly determine the outcome of each game. The game is designed to return a certain percentage of the amount wagered back to the player over the course of many plays or instances of the game, which is generally referred to as return to player (RTP). The RTP and randomness of the RNG ensure the fairness of the games and are highly regulated. Upon initiation of play, the RNG randomly determines a game outcome and symbols are then selected which correspond to that outcome. Notably, some games may include an element of skill on the part of the player and are therefore not entirely random.

SUMMARY

In one embodiment, a non-transitory computer-readable medium containing instructions embodied thereon is provided. When executed by at least one processor, the instructions cause the at least one processor to (i) cause to be displayed, on a multiplayer game display, a group metamorphic game element, wherein the group metamorphic game element includes a plurality of communal game elements, the group metamorphic game element configured to interact with each of the plurality of electronic gaming machines, (ii) activate, during a first game play on a first electronic gaming machine of the plurality of electronic gaming machines and based on an output of a random number generator (RNG) at the multiplayer game server, a multiplayer feature of the multiplayer game, (iii) cause the group metamorphic game element to transition one of the communal game elements from the multiplayer game display to an individual metamorphic game element associated with the first electronic gaming machine, thereby removing the communal game element from the group metamorphic game element, wherein the group metamorphic game element dynamically interacts with the individual metamorphic game element of each of the plurality of electronic gaming machines, and (iv) based on the transitioned communal game element, apply the activated multiplayer feature to a first game play on the first electronic gaming machine.

In another embodiment, a computer-implemented method of providing a multiplayer game to players of a plurality of electronic gaming machines using a multiplayer game server is provided. The multiplayer game server includes at least one processor. The method includes (i) causing to be displayed, on a multiplayer game display, a group metamorphic game element, wherein the group metamorphic game element includes a plurality of communal game elements, the group metamorphic game element configured to interact with each of the plurality of electronic gaming machines, (ii) activating, during a first game play on a first electronic gaming machine of the plurality of electronic gaming machines and based on an output of a RNG at the multiplayer game server, a multiplayer feature of the multiplayer game, (iii) causing the group metamorphic game element to transition one of the communal game elements from the multiplayer game display to an individual metamorphic game element associated with the first electronic gaming machine, thereby removing the communal game element from the group metamorphic game element, wherein the group metamorphic game element dynamically interacts with the individual metamorphic game element of each of the plurality of electronic gaming machines, and (iv) based on the transitioned communal game element, applying the activated multiplayer feature to a first game play on the first electronic gaming machine.

In yet another embodiment, a system comprising a multiplayer game server for providing a multiplayer game to players of a plurality of electronic gaming machines is provided. The multiplayer game server includes at least one processor configured to: (i) cause to be displayed, on a multiplayer game display, a group metamorphic game element, wherein the group metamorphic game element includes a plurality of communal game elements, the group metamorphic game element configured to interact with each of the plurality of electronic gaming machines, (ii) activate, during a first game play on a first electronic gaming machine of the plurality of electronic gaming machines and based on an output of a RNG at the multiplayer game server, a multiplayer feature of the multiplayer game, (iii) cause the group metamorphic game element to transition one of the communal game elements from the multiplayer game display to an individual metamorphic game element associated with the first electronic gaming machine, thereby removing the communal game element from the group metamorphic game element, wherein the group metamorphic game element dynamically interacts with the individual metamorphic game element of each of the plurality of electronic gaming machines, and (iv) based on the transitioned communal game element, apply the activated multiplayer feature to a first game play on the first electronic gaming machine.

In yet another embodiment, a multiplayer gaming system for providing a multiplayer game to players of electronic gaming devices is provided. The multiplayer gaming system comprises a plurality of electronic gaming machines and a communal display (e.g., a multiplayer game display). The plurality of electronic gaming machines includes a first electronic gaming machine comprising a game controller configured to execute instructions stored in a memory, which when executed, cause the game controller to: (i) cause to be displayed, on the communal display, a group metamorphic game element, wherein the group metamorphic game element includes a plurality of communal game elements, the group metamorphic game element configured to interact with each of the plurality of electronic gaming machines, (ii) activate, during a first game play on the first electronic gaming machine and based on an output of a RNG at the first electronic gaming machine, a multiplayer feature of the multiplayer game, (iii) cause the group metamorphic game element to transition one of the communal game elements from the communal display to an individual metamorphic game element associated with the first electronic gaming machine, thereby removing the communal game element from the group metamorphic game element, wherein the group metamorphic game element dynamically interacts with the individual metamorphic game element of each of the plurality of electronic gaming machines, and (iv) based on the transitioned communal game element, apply the activated multiplayer feature to a first game play on the first electronic gaming machine.

BRIEF DESCRIPTION OF THE DRAWINGS

An example embodiment of the subject matter disclosed will now be described with reference to the accompanying drawings.

DETAILED DESCRIPTION

Figure 1:
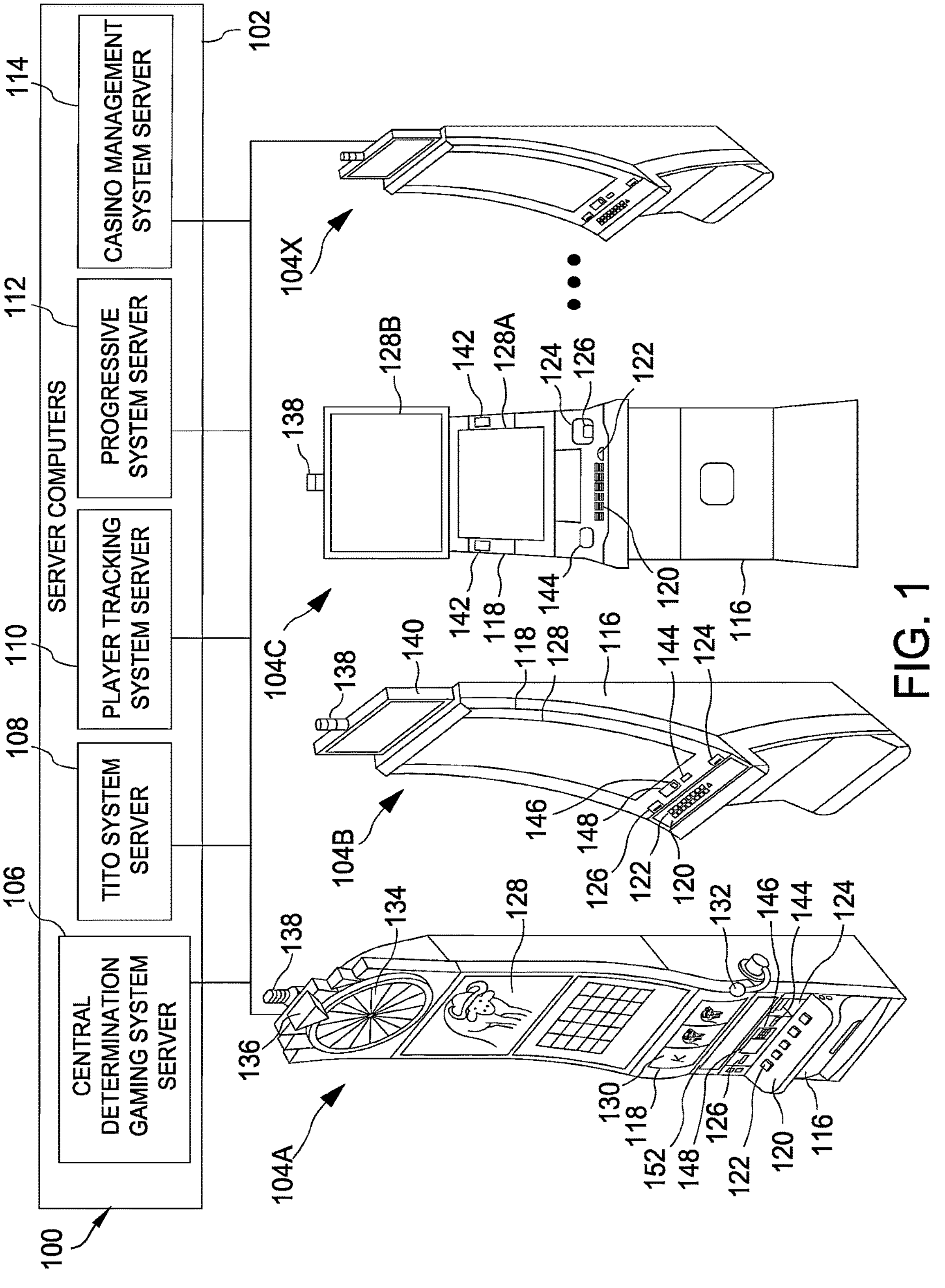
FIG. 1 is an example diagram showing several EGMs networked with various gaming-related servers.

A group metamorphic game element is described. In an example embodiment, a multiplayer base game is played by two or more players in an electronic gaming machine (EGM) archway. The multiplayer base game includes a group metamorphic game element as well as an individual metamorphic game element. The group metamorphic game element could be a "money tree" or "fortune tree" that grows coins, lucky envelopes, and/or fruit. The money tree can be seen by all the players of the multiplayer base game, from each player station (e.g., EGM). Coins, lucky envelopes, and fruit randomly fall from the money tree and into bowls displayed on the player stations as players engage in subsequent rounds of gameplay. In some embodiments, wild symbols, cash symbols, tiered jackpots, butterflies, and/or rainbows may be present on the money tree. Each of these symbols may "grow" on the tree and subsequently fall into a player's bowl. In an example embodiment, each player station interacts with the group metamorphic game element, such as the money tree. For example, each player station may feed or supply "money leaves" that grow or append to the money tree. The "money leaves" could dynamically change properties, such as, for example, shape or color, to represent an accumulation of a single player's game equity and/or the likelihood that the players will eventually activate a community bonus.

In an example embodiment, reels of a player's personal play area on an individual player station are simulated to spin and stop. A player may be awarded based on the reel symbol outcomes. During gameplay of the base game, the "money leaves" of the money tree may sway and randomly shake to transfer a communal game element (e.g., coins, lucky envelopes, fruit) from the tree to the player's individual metamorphic game element (e.g., a bowl displayed on the player station). In one embodiment, a random number generator (RNG) on an individual EGM is utilized to transfer communal game elements to an individual metamorphic game element displayed on that particular EGM. In some embodiments, a single player's winnings affect the winnings of the other players who are engaged in the multiplayer base game with the player. When a first player associated with a first player station activates an envelope coin feature, an envelope credit feature, and/or a bowl explosion feature, as described in detail below, the first player may receive the bulk of the prize (e.g., coins, credit awards). Additionally, the other players may also receive one or more coins and/or credit awards associated with the first player's winnings as an ancillary benefit to encourage group play of the multiplayer base game. In an example embodiment, the player who triggers the feature is awarded the highest amount of coins and/or credit awards. In some embodiments, those who bet more and/or bet the maximum, as compared to other players, are awarded more coins and/or credit awards than those who bet less.

Although the group metamorphic game element is described herein as a money tree, the group metamorphic game element may be represented as any suitable environment, such as, for example, an underwater environment with fish and sharks, a beach environment with varying degrees of waves, a storm environment with lightening, a firework environment with different intensities of fireworks, a battleship environment, a koi pond with multiple koi fish, and/or a tournament environment where players compete against one another.

Several EGM archways could be utilized for the group metamorphic game element. In some embodiments, EGM archways may be used for the multiplayer game. The EGM archways may include a plurality of EGMs, arranged in spatially opposing pairs, each having one or more curved display screens. The curved display screens of each EGM pair may form a lower portion of an arc of either archway, and a plurality of curved and or planar display screens may be added between the two lower portions of either archway to complete a curvature of the archways. In addition, EGMs may be positioned side-by-side to create longer or shorter archways, such as ring-shaped and tunnel-shaped archways. In operation, a variety of multiplayer wager games may be implemented using the archways, and EGMs forming the archways may interact or influence each other.

FIG. 1 illustrates several different models of EGMs which may be networked to various gaming related servers. Shown is a system 100 in a gaming environment including one or more server computers 102 (e.g., slot servers of a casino) that are in communication, via a communications network, with one or more gaming devices 104A-104X (EGMs, slots, video poker, bingo machines, etc.) that can implement one or more aspects of the present disclosure. The gaming devices 104A-104X may alternatively be portable and/or remote gaming devices such as, but not limited to, a smart phone, a tablet, a laptop, or a game console. Gaming devices 104A-104X utilize specialized software and/or hardware to form non-generic, particular machines or apparatuses that comply with regulatory requirements regarding devices used for wagering or games of chance that provide monetary awards.

Communication between the gaming devices 104A-104X and the server computers 102, and among the gaming devices 104A-104X, may be direct or indirect using one or more communication protocols. As an example, gaming devices 104A-104X and the server computers 102 can communicate over one or more communication networks, such as over the Internet through a website maintained by a computer on a remote server or over an online data network including commercial online service providers, Internet service providers, private networks (e.g., local area networks and enterprise networks), and the like (e.g., wide area networks). The communication networks could allow gaming devices 104A-104X to communicate with one another and/or the server computers 102 using a variety of communication-based technologies, such as radio frequency (RF) (e.g., wireless fidelity (WiFi®) and Bluetooth®), cable TV, satellite links and the like.

In some implementations, server computers 102 may not be necessary and/or preferred. For example, in one or more implementations, a stand-alone gaming device such as gaming device 104A, gaming device 104B or any of the other gaming devices 104C-104X can implement one or more aspects of the present disclosure. However, it is typical to find multiple EGMs connected to networks implemented with one or more of the different server computers 102 described herein.

The server computers 102 may include a central determination gaming system server 106, a ticket-in-ticket-out (TITO) system server 108, a player tracking system server 110, a progressive system server 112, and/or a casino management system server 114. Gaming devices 104A-104X may include features to enable operation of any or all servers for use by the player and/or operator (e.g., the casino, resort, gaming establishment, tavern, pub, etc.). For example, game outcomes may be generated on a central determination gaming system server 106 and then transmitted over the network to any of a group of remote terminals or remote gaming devices 104A-104X that utilize the game outcomes and display the results to the players.

Gaming device 104A is often of a cabinet construction which may be aligned in rows or banks of similar devices for placement and operation on a casino floor. The gaming device 104A often includes a main door which provides access to the interior of the cabinet. Gaming device 104A typically includes a button area or button deck 120 accessible by a player that is configured with input switches or buttons 122, an access channel for a bill validator 124, and/or an access channel for a ticket-out printer 126.

In FIG. 1, gaming device 104A is shown as a Relm XL™ model gaming device manufactured by Aristocrat® Technologies, Inc. As shown, gaming device 104A is a reel machine having a gaming display area 118 comprising a number (typically 3 or 5) of mechanical reels 130 with various symbols displayed on them. The mechanical reels 130 are independently spun and stopped to show a set of symbols within the gaming display area 118 which may be used to determine an outcome to the game.

In many configurations, the gaming device 104A may have a main display 128 (e.g., video display monitor) mounted to, or above, the gaming display area 118. The main display 128 can be a high-resolution liquid crystal display (LCD), plasma, light emitting diode (LED), or organic light emitting diode (OLED) panel which may be flat or curved as shown, a cathode ray tube, or other conventional electronically controlled video monitor.

In some implementations, the bill validator 124 may also function as a "ticket-in" reader that allows the player to use a casino issued credit ticket to load credits onto the gaming device 104A (e.g., in a cashless ticket ("TITO") system). In such cashless implementations, the gaming device 104A may also include a "ticket-out" printer 126 for outputting a credit ticket when a "cash out" button is pressed. Cashless TITO systems are used to generate and track unique barcodes or other indicators printed on tickets to allow players to avoid the use of bills and coins by loading credits using a ticket reader and cashing out credits using a ticket-out printer 126 on the gaming device 104A. The gaming device 104A can have hardware meters for purposes including ensuring regulatory compliance and monitoring the player credit balance. In addition, there can be additional meters that record the total amount of money wagered on the gaming device, total amount of money deposited, total amount of money withdrawn, total amount of winnings on gaming device 104A.

In some implementations, a player tracking card reader 144, a transceiver for wireless communication with a mobile device (e.g., a player's smartphone), a keypad 146, and/or an illuminated display 148 for reading, receiving, entering, and/or displaying player tracking information is provided in gaming device 104A. In such implementations, a game controller within the gaming device 104A can communicate with the player tracking system server 110 to send and receive player tracking information.

Gaming device 104A may also include a bonus topper wheel 134. When bonus play is triggered (e.g., by a player achieving a particular outcome or set of outcomes in the primary game), bonus topper wheel 134 is operative to spin and stop with indicator arrow 136 indicating the outcome of the bonus game. Bonus topper wheel 134 is typically used to play a bonus game, but it could also be incorporated into play of the base or primary game.

A candle 138 may be mounted on the top of gaming device 104A and may be activated by a player (e.g., using a switch or one of buttons 122) to indicate to operations staff that gaming device 104A has experienced a malfunction or the player requires service. The candle 138 is also often used to indicate a jackpot has been won and to alert staff that a hand payout of an award may be needed.

There may also be one or more information panels 152 which may be a back-lit, silkscreened glass panel with lettering to indicate general game information including, for example, a game denomination (e.g., $0.25 or $1), pay lines, pay tables, and/or various game related graphics. In some implementations, the information panel(s) 152 may be implemented as an additional video display.

Gaming devices 104A have traditionally also included a handle 132 typically mounted to the side of main cabinet 116 which may be used to initiate game play.

Figure 2:
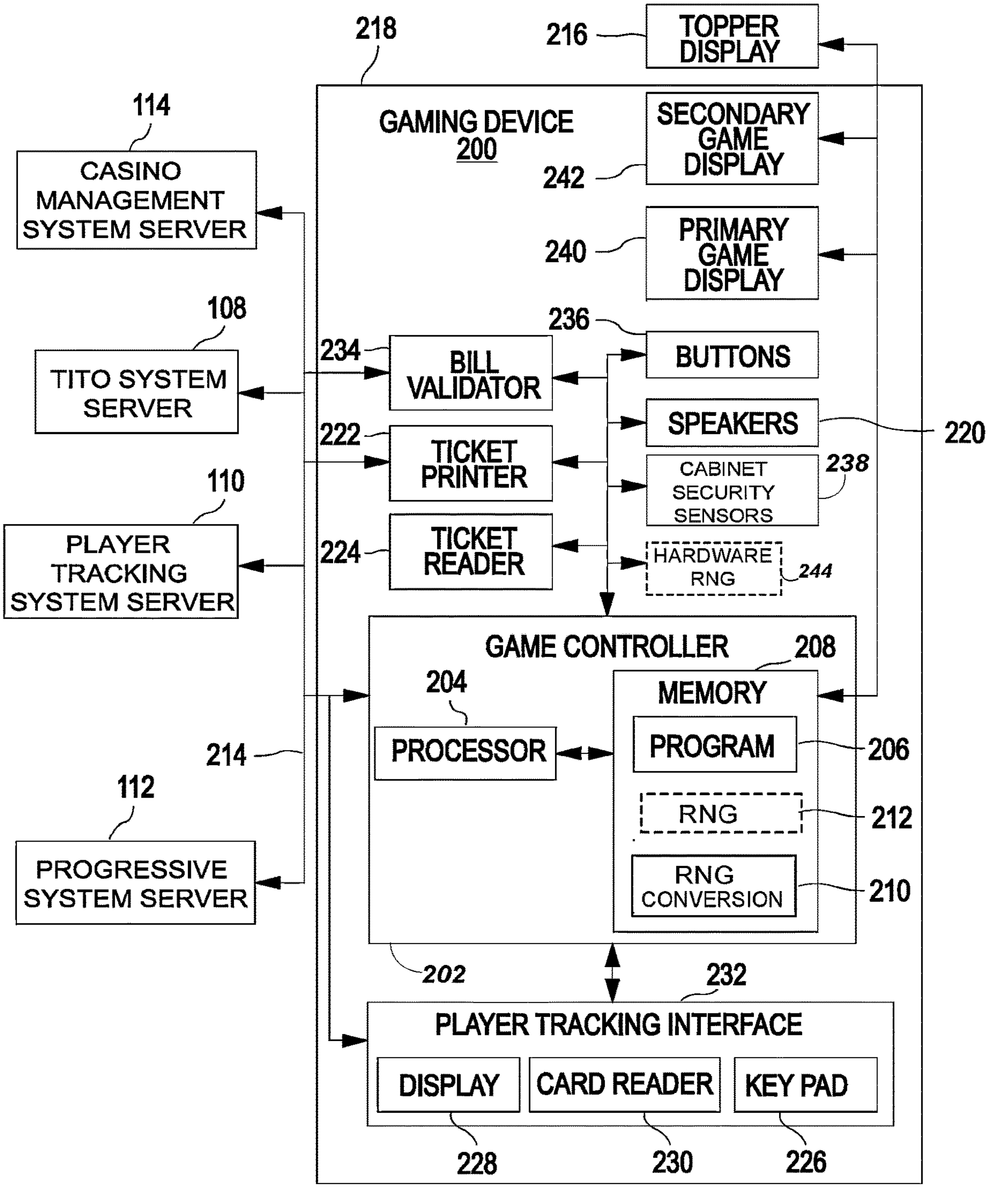
FIG. 2 is a block diagram showing various functional elements of an example EGM.

Many or all the above described components can be controlled by circuitry (e.g., a game controller) housed inside the main cabinet 116 of the gaming device 104A, the details of which are shown in FIG. 2.

An alternative example gaming device 104B illustrated in FIG. 1 is the Arc™ model gaming device manufactured by Aristocrat® Technologies, Inc. Note that where possible, reference numerals identifying similar features of the gaming device 104A implementation are also identified in the gaming device 104B implementation using the same reference numbers. Gaming device 104B does not include physical reels and instead shows game play functions on main display 128. An optional topper screen 140 may be used as a secondary game display for bonus play, to show game features or attraction activities while a game is not in play, or any other information or media desired by the game designer or operator. In some implementations, the optional topper screen 140 may also or alternatively be used to display progressive jackpot prizes available to a player during play of gaming device 104B.

Example gaming device 104B includes a main cabinet 116 including a main door which opens to provide access to the interior of the gaming device 104B. The main or service door is typically used by service personnel to refill the ticket-out printer 126 and collect bills and tickets inserted into the bill validator 124. The main or service door may also be accessed to reset the machine, verify and/or upgrade the software, and for general maintenance operations.

Another example gaming device 104C shown is the Helix™ model gaming device manufactured by Aristocrat® Technologies, Inc. Gaming device 104C includes a main display 128A that is in a landscape orientation. Although not illustrated by the front view provided, the main display 128A may have a curvature radius from top to bottom, or alternatively from side to side. In some implementations, main display 128A is a flat panel display. Main display 128A is typically used for primary game play while secondary display 128B is typically used for bonus game play, to show game features or attraction activities while the game is not in play or any other information or media desired by the game designer or operator. In some implementations, example gaming device 104C may also include speakers 142 to output various audio such as game sound, background music, etc.

Many different types of games, including mechanical slot games, video slot games, video poker, video black jack, video pachinko, keno, bingo, and lottery, may be provided with or implemented within the depicted gaming devices 104A-104C and other similar gaming devices. Each gaming device may also be operable to provide many different games. Games may be differentiated according to themes, sounds, graphics, type of game (e.g., slot game vs. card game vs. game with aspects of skill), denomination, number of paylines, maximum jackpot, progressive or non-progressive, bonus games, and may be deployed for operation in Class 2 or Class 3, etc.

FIG. 2 is a block diagram depicting exemplary internal electronic components of a gaming device 200 connected to various external systems. All or parts of the gaming device 200 shown could be used to implement any one of the example gaming devices 104A-X depicted in FIG. 1. As shown in FIG. 2, gaming device 200 includes a topper display 216 or another form of a top box (e.g., a topper wheel, a topper screen, etc.) that sits above cabinet 218. Cabinet 218 or topper display 216 may also house a number of other components which may be used to add features to a game being played on gaming device 200, including speakers 220, a ticket printer 222 which prints bar-coded tickets or other media or mechanisms for storing or indicating a player's credit value, a ticket reader 224 which reads bar-coded tickets or other media or mechanisms for storing or indicating a player's credit value, and a player tracking interface 232. Player tracking interface 232 may include a keypad 226 for entering information, a player tracking display 228 for displaying information (e.g., an illuminated or video display), a card reader 230 for receiving data and/or communicating information to and from media or a device such as a smart phone enabling player tracking. FIG. 2 also depicts utilizing a ticket printer 222 to print tickets for a TITO system server 108. Gaming device 200 may further include a bill validator 234, player-input buttons 236 for player input, cabinet security sensors 238 to detect unauthorized opening of the cabinet 218, a primary game display 240, and a secondary game display 242, each coupled to and operable under the control of game controller 202.

The games available for play on the gaming device 200 are controlled by a game controller 202 that includes one or more processors 204. Processor 204 represents a general-purpose processor, a specialized processor intended to perform certain functional tasks, or a combination thereof. As an example, processor 204 can be a central processing unit (CPU) that has one or more multi-core processing units and memory mediums (e.g., cache memory) that function as buffers and/or temporary storage for data. Alternatively, processor 204 can be a specialized processor, such as an application specific integrated circuit (ASIC), graphics processing unit (GPU), field-programmable gate array (FPGA), digital signal processor (DSP), or another type of hardware accelerator. In another example, processor 204 is a system on chip (SoC) that combines and integrates one or more general-purpose processors and/or one or more specialized processors. Although FIG. 2 illustrates that game controller 202 includes a single processor 204, game controller 202 is not limited to this representation and instead can include multiple processors 204 (e.g., two or more processors).

FIG. 2 illustrates that processor 204 is operatively coupled to memory 208. Memory 208 is defined herein as including volatile and nonvolatile memory and other types of non-transitory data storage components. Volatile memory is memory that do not retain data values upon loss of power. Nonvolatile memory is memory that do retain data upon a loss of power. Examples of memory 208 include random access memory (RAM), read-only memory (ROM), hard disk drives, solid-state drives, universal serial bus (USB) flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, examples of RAM include static random access memory (SRAM), dynamic random access memory (DRAM), magnetic random access memory (MRAM), and other such devices. Examples of ROM include a programmable read-only memory (PROM), an erasable programmable read-only memory (EPROM), an electrically erasable programmable read-only memory (EEPROM), or other like memory device. Even though FIG. 2 illustrates that game controller 202 includes a single memory 208, game controller 202 could include multiple memories 208 for storing program instructions and/or data.

Memory 208 can store one or more game programs 206 that provide program instructions and/or data for carrying out various implementations (e.g., game mechanics) described herein. Stated another way, game program 206 represents an executable program stored in any portion or component of memory 208. In one or more implementations, game program 206 is embodied in the form of source code that includes human-readable statements written in a programming language or machine code that contains numerical instructions recognizable by a suitable execution system, such as a processor 204 in a game controller or other system. Examples of executable programs include: (1) a compiled program that can be translated into machine code in a format that can be loaded into a random access portion of memory 208 and run by processor 204; (2) source code that may be expressed in proper format such as object code that is capable of being loaded into a random access portion of memory 208 and executed by processor 204; and (3) source code that may be interpreted by another executable program to generate instructions in a random access portion of memory 208 to be executed by processor 204.

Alternatively, game program 206 can be set up to generate one or more game instances based on instructions and/or data that gaming device 200 exchanges with one or more remote gaming device such as a central determination gaming system server 106 (not shown in FIG. 2 but shown in FIG. 1). For purpose of this disclosure, the term "game instance" refers to a play or a round of a game that gaming device 200 presents (e.g., via a user interface (UI)) to a player. The game instance is communicated to gaming device 200 via the network 214 and then displayed on gaming device 200. For example, gaming device 200 may execute game program 206 as video streaming software that allows the game to be displayed on gaming device 200. When a game is stored on gaming device 200, it may be loaded from a memory 208 (e.g., from a read only memory (ROM)) or from the central determination gaming system server 106 to memory 208.

Gaming devices, such as gaming device 200, are highly regulated to ensure fairness and, in many cases, gaming device 200 is operable to award monetary awards (e.g., typically dispensed in the form of a redeemable voucher). Therefore, to satisfy security and regulatory requirements in a gaming environment, hardware and software architectures are implemented in gaming devices 200 that differ significantly from those of general-purpose computers. Adapting general purpose computers to function as gaming devices 200 is not simple or straightforward because of: (1) the regulatory requirements for gaming devices 200, (2) the harsh environment in which gaming devices 200 operate, (3) security requirements, (4) fault tolerance requirements, and (5) the requirement for additional special purpose componentry enabling functionality of an EGM. These differences require substantial engineering effort with respect to game design implementation, game mechanics, hardware components, and software.

One regulatory requirement for games running on gaming device 200 generally involves complying with a certain level of randomness. Typically, gaming jurisdictions mandate that gaming devices 200 satisfy a minimum level of randomness without specifying how a gaming device 200 should achieve this level of randomness. To comply, FIG. 2 illustrates that gaming device 200 could include an RNG 212 that utilizes hardware and/or software to generate RNG outcomes that lack any pattern. The RNG operations are often specialized and non-generic in order to comply with regulatory and gaming requirements. For example, in a slot game, game program 206 can initiate multiple RNG calls to RNG 212 to generate RNG outcomes, where each RNG call and RNG outcome corresponds to an outcome for a reel. In another example, gaming device 200 can be a Class II gaming device where RNG 212 generates RNG outcomes for creating Bingo cards. In one or more implementations, RNG 212 could be one of a set of RNGs operating on gaming device 200. More generally, an output of the RNG 212 can be the basis on which game outcomes are determined by the game controller 202. Game developers could vary the degree of true randomness for each RNG (e.g., pseudorandom) and utilize specific RNGs depending on game requirements. The output of the RNG 212 can include a random number or pseudorandom number (either is generally referred to as a "random number").

In FIG. 2, RNG 212 and hardware RNG 244 are shown in dashed lines to illustrate that RNG 212, hardware RNG 244, or both can be included in gaming device 200. In one implementation, instead of including RNG 212, gaming device 200 could include a hardware RNG 244 that generates RNG outcomes. Analogous to RNG 212, hardware RNG 244 performs specialized and non-generic operations in order to comply with regulatory and gaming requirements. For example, because of regulation requirements, hardware RNG 244 could be a random number generator that securely produces random numbers for cryptography use. The gaming device 200 then uses the secure random numbers to generate game outcomes for one or more game features. In another implementation, the gaming device 200 could include both hardware RNG 244 and RNG 212. RNG 212 may utilize the RNG outcomes from hardware RNG 244 as one of many sources of entropy for generating secure random numbers for the game features.

Another regulatory requirement for running games on gaming device 200 includes ensuring a certain level of RTP. Similar to the randomness requirement discussed above, numerous gaming jurisdictions also mandate that gaming device 200 provides a minimum level of RTP (e.g., RTP of at least 75%). A game can use one or more lookup tables (also called weighted tables) as part of a technical solution that satisfies regulatory requirements for randomness and RTP. In particular, a lookup table can integrate game features (e.g., trigger events for special modes or bonus games; newly introduced game elements such as extra reels, new symbols, or new cards; stop positions for dynamic game elements such as spinning reels, spinning wheels, or shifting reels; or card selections from a deck) with random numbers generated by one or more RNGs, so as to achieve a given level of volatility for a target level of RTP. (In general, volatility refers to the frequency or probability of an event such as a special mode, payout, etc. For example, for a target level of RTP, a higher-volatility game may have a lower payout most of the time with an occasional bonus having a very high payout, while a lower-volatility game has a steadier payout with more frequent bonuses of smaller amounts.) Configuring a lookup table can involve engineering decisions with respect to how RNG outcomes are mapped to game outcomes for a given game feature, while still satisfying regulatory requirements for RTP. Configuring a lookup table can also involve engineering decisions about whether different game features are combined in a given entry of the lookup table or split between different entries (for the respective game features), while still satisfying regulatory requirements for RTP and allowing for varying levels of game volatility.

FIG. 2 illustrates that gaming device 200 includes an RNG conversion engine 210 that translates the RNG outcome from RNG 212 to a game outcome presented to a player. To meet a designated RTP, a game developer can set up the RNG conversion engine 210 to utilize one or more lookup tables to translate the RNG outcome to a symbol element, stop position on a reel strip layout, and/or randomly chosen aspect of a game feature. As an example, the lookup tables can regulate a prize payout amount for each RNG outcome and how often the gaming device 200 pays out the prize payout amounts. The RNG conversion engine 210 could utilize one lookup table to map the RNG outcome to a game outcome displayed to a player and a second lookup table as a pay table for determining the prize payout amount for each game outcome. The mapping between the RNG outcome to the game outcome controls the frequency in hitting certain prize payout amounts.

FIG. 2 also depicts that gaming device 200 is connected over network 214 to player tracking system server 110. Player tracking system server 110 may be, for example, an OASIS® system manufactured by Aristocrat® Technologies, Inc. Player tracking system server 110 is used to track play (e.g., amount wagered, games played, time of play and/or other quantitative or qualitative measures) for individual players so that an operator may reward players in a loyalty program. The player may use the player tracking interface 232 to access his/her account information, activate free play, and/or request various information. Player tracking or loyalty programs seek to reward players for their play and help build brand loyalty to the gaming establishment. The rewards typically correspond to the player's level of patronage (e.g., to the player's playing frequency and/or total amount of game plays at a given casino). Player tracking rewards may be complimentary and/or discounted meals, lodging, entertainment and/or additional play. Player tracking information may be combined with other information that is now readily obtainable by a casino management system.

When a player wishes to play the gaming device 200, he/she can insert cash or a ticket voucher through a coin acceptor (not shown) or bill validator 234 to establish a credit balance on the gaming device. The credit balance is used by the player to place wagers on instances of the game and to receive credit awards based on the outcome of winning instances. The credit balance is decreased by the amount of each wager and increased upon a win. The player can add additional credits to the balance at any time. The player may also optionally insert a loyalty club card into the card reader 230. During the game, the player views with one or more UIs, the game outcome on one or more of the primary game display 240 and secondary game display 242. Other game and prize information may also be displayed.

For each game instance, a player may make selections, which may affect play of the game. For example, the player may vary the total amount wagered by selecting the amount bet per line and the number of lines played. In many games, the player is asked to initiate or select options during course of game play (such as spinning a wheel to begin a bonus round or select various items during a feature game). The player may make these selections using the player-input buttons 236, the primary game display 240 which may be a touch screen, or using some other device which enables a player to input information into the gaming device 200.

During certain game events, the gaming device 200 may display visual and auditory effects that can be perceived by the player. These effects add to the excitement of a game, which makes a player more likely to enjoy the playing experience. Auditory effects include various sounds that are projected by the speakers 220. Visual effects include flashing lights, strobing lights or other patterns displayed from lights on the gaming device 200 or from lights behind the information panel 152 (FIG. 1).

When the player is done, he/she cashes out the credit balance (typically by pressing a cash out button to receive a ticket from the ticket printer 222). The ticket may be "cashed-in" for money or inserted into another machine to establish a credit balance for play.

Figure 3:
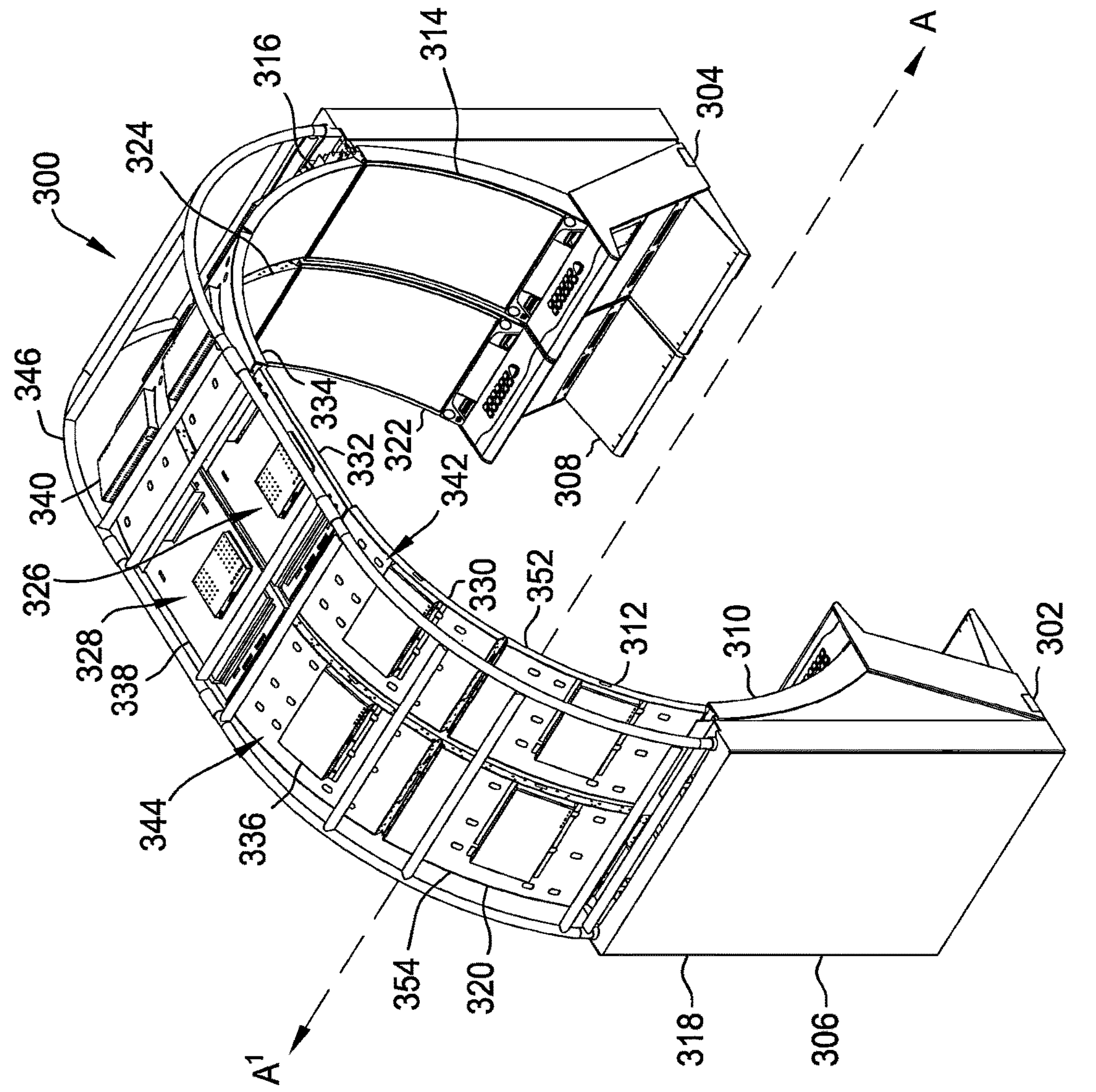
FIG. 3 is a perspective view of a first example embodiment of an EGM archway including a plurality of EGMs, as shown in FIG. 1 and FIG. 2.
Figure 4:
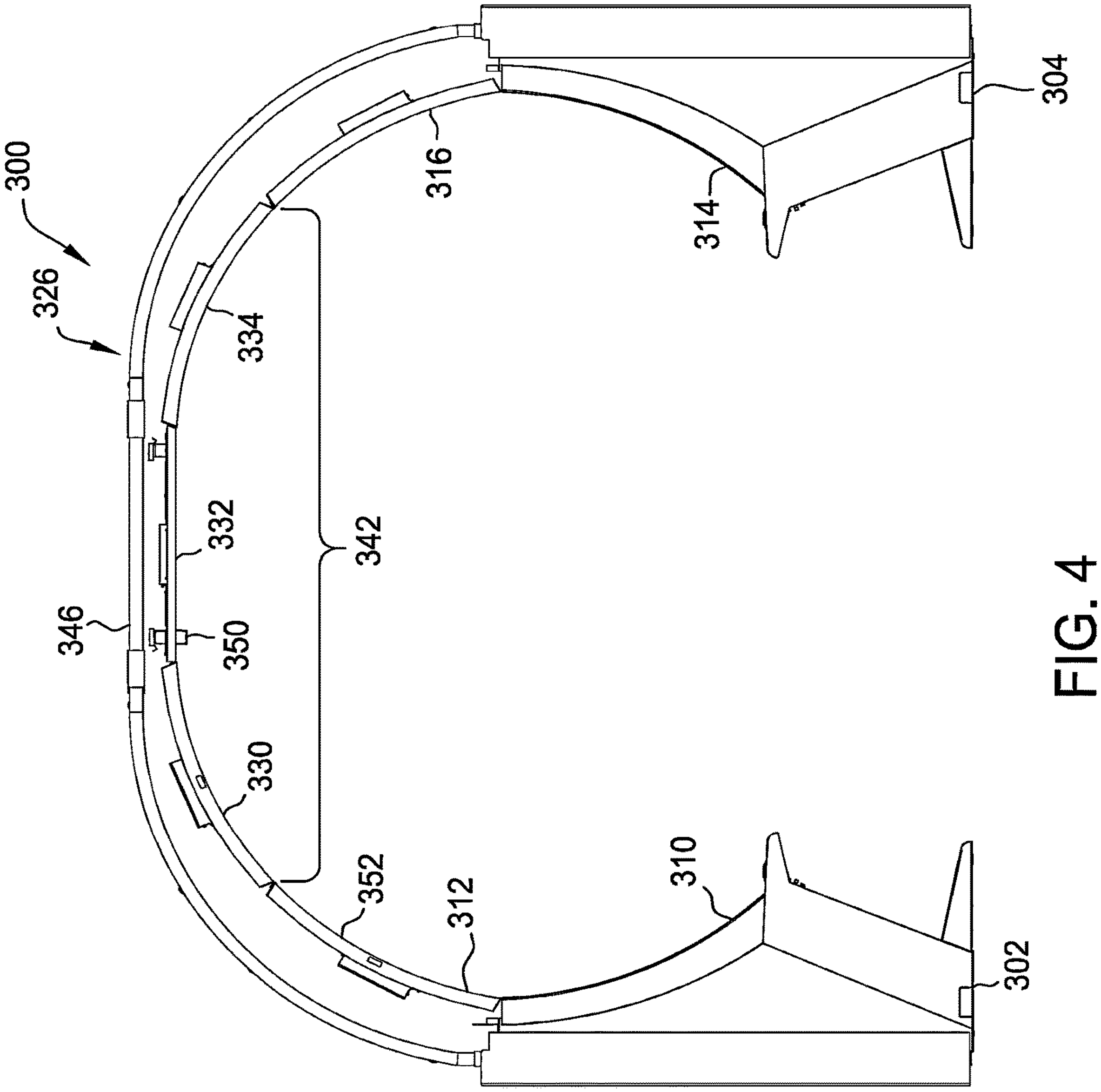
FIG. 4 is a side view of the first example embodiment of the EGM archway shown in FIG. 3.

FIG. 3 is a perspective view of a first example embodiment of an EGM archway 300. Likewise, FIG. 4 is a side view of the first example embodiment of EGM archway 300. EGM archway 300 extends axially along a centerline $A\text{-}A^1$.

Accordingly, in the first example embodiment, EGM archway 300 includes a first EGM 302, a second EGM 304, a third EGM 306, and a fourth EGM 308. In general, EGMs 302-308 may include any suitable electronic gaming machine or gaming device, such as any of gaming devices 104A-104X, as described herein. EGMs 302-308 may also include any of the computer architecture shown in FIG. 2 (with reference to gaming device or EGM 200).

First EGM 302 includes at least a first curved display device 310 and a second curved display device 312. Second EGM 304 includes at least a first curved display device 314 and a second curved display device 316. Third EGM 306 includes at least a first curved display device 318 and a second curved display device 320. Fourth EGM 308 includes at least a first curved display device 322 and a second curved display device 324. First EGM 302, second EGM 304, third EGM 306, and fourth EGM 308 may collectively be referred to as player stations. First curved display devices 310, 314, 318, and 322 may be referred to as bottom display devices. Second curved display devices 312, 316, 320, and 324 may be referred to as top display devices. Although in this example embodiment, each EGM 302-308 includes two curved display devices (e.g., two curved display screens), in other embodiments, any other number of curved display devices may be included in any of EGMs 302-308.

In some embodiments, the curved display devices of each EGM 302-308 may be mechanically and/or electrically coupled to create a larger curved display of each EGM 302-308. For example, first curved display device 310 and second curved display device 312 may be mechanically and/or electrically coupled to create a larger curved display of EGM 302. The same may be true for the remaining EGMs 304-308. Although each EGM 302-308 includes two curved display devices in this example, it will be appreciated that any number of curved display devices may be provided in association with an EGM 302-308 (including a single curved display device), and that as a number of curved display devices are adjusted or changed, a curvature or arc associated with each EGM 302-308 may also be changed or adjusted (e.g., to increase and/or decrease, as the case may be).

In addition, in at least some embodiments, first EGM 302 may be spaced apart from and diametrically opposed to second EGM 304, such that EGMs 302 and 304 are spatially opposite and facing one another. Similarly, third EGM 306 may be spaced apart from and diametrically opposed to fourth EGM 308, such that EGMs 306 and 308 are spatially opposite and facing one another.

As a result, first EGM 302 and second EGM 304 may together define opposing lower or non-overhead portions of a first archway section 326, and third EGM 306 and fourth EGM 308 may together define opposing lower or non-overhead portions of a second archway section 328. As shown, first archway section 326 and second archway section 328 may abut one another, such that archway 300 is substantially continuous along axis $A\text{-}A^1$.

In addition, it will be appreciated that any number of EGMs may be arranged along axis $A\text{-}A^1$ to create an archway 300 of any length along axis $A\text{-}A^1$. For example, in some embodiments, archway 300 may include only a single pair of EGMs, such as EGMs 302 and 304, to define a ring-shaped archway. In another embodiment, archway 300 includes EGMs 302-308 to define a short tunnel-shaped archway having two sections 326 and 328, and in yet another embodiment, archway 300 includes greater than four EGMs to define a longer tunnel-shaped archway having, for example, greater than two sections.

In addition to the portions of each archway section 326 and 328 defined by EGMs 302-308 (e.g., the lower or substantially non-overhead portions), in various embodiments, one or more display devices may be mechanically and/or electrically coupled between first EGM 302 and second EGM 304. Likewise, one or more display devices may be mechanically and/or electrically coupled between third EGM 306 and fourth EGM 308.

More particularly, in at least the first example embodiment, a first overhead display device 330, a second overhead display device 332, and a third overhead display device 334 may extend between first EGM 302 and second EGM 304. Similarly, a fourth overhead display device 336, a fifth overhead display device 338, and a sixth overhead display device 340 may extend between third EGM 306 and fourth EGM 308.

Overhead display devices 330-340 may include a variety of shapes and may be joined or coupled, as shown and described, between respective EGMs 302-308 to define overhead portions of archway 300. Specifically, first overhead display device 330, second overhead display device 332, and third overhead display device 334 may extend between first EGM 302 and second EGM 304 to define a first overhead portion 342. Similarly, fourth overhead display device 336, fifth overhead display device 338, and sixth overhead display device 340 may extend between third EGM 306 and fourth EGM 308 to define a second overhead portion 344.

As shown, in at least one embodiment, first overhead display device 330 includes a curvature and extends from an edge of second display device 312 of first EGM 302. Likewise, third overhead display device 334 includes a curvature and extends from an edge of second display device 316 of second EGM 304. Second overhead display device 332 is substantially planar and extends overhead between first overhead display device 330 and third overhead display device 334 to complete first section 326 of archway 300 between first EGM 302 and second EGM 304. In other embodiments, second overhead display device 332 may also include a curvature.

Similarly, fourth overhead display device 336 includes a curvature and extends from an edge of second display device 320 of third EGM 306. Likewise, sixth overhead display device 340 includes a curvature and extends from an edge of second display device 324 of fourth EGM 308. Fifth overhead display device 338 is substantially planar and extends overhead between fourth overhead display device 336 and sixth overhead display device 340 to complete second section 328 of archway 300 between third EGM 306 and fourth EGM 308. In other embodiments, fifth overhead display device 338 may also include a curvature.

In addition, to suspend or mount overhead display devices 330-340, an external frame 346 may be provided. External frame 346 may attach to one or more EGMs, such as EGMs 302-308. In some embodiments, a plurality of such external frames may be provided and may attach to one or more EGMs 302-308 as well. In either case, each overhead display device 330-340 may be mechanically coupled to and supported in an overhead position by external frame 346. In other embodiments, one or more overhead display devices 330-340 may be suspended from a ceiling or overhead surface.

In yet another embodiment, overhead display devices 330-340 may be pressure-fit or snap-fit into an interlocking arrangement of overhead display devices 330-340. For example, archway 300 may be configured to function in a manner similar to an arch bridge by transferring at least some of the weight of archway 300 and its loads (if any) at least partially into a horizontal thrust that is restrained at either side by one or more abutments, where the abutments in this case include EGMs 302-308.

In some embodiments, archway 300 may include a plurality of side-mounted display devices. Although not shown in FIG. 3, side-mounted display devices may be included on one or more edges of archway 300, such as along a first edge 352 and/or along a second edge 354. As a result, in at least some embodiments, an edge 352 and/or 354 of archway 300 may also be configured to provide graphics.

Figure 5:
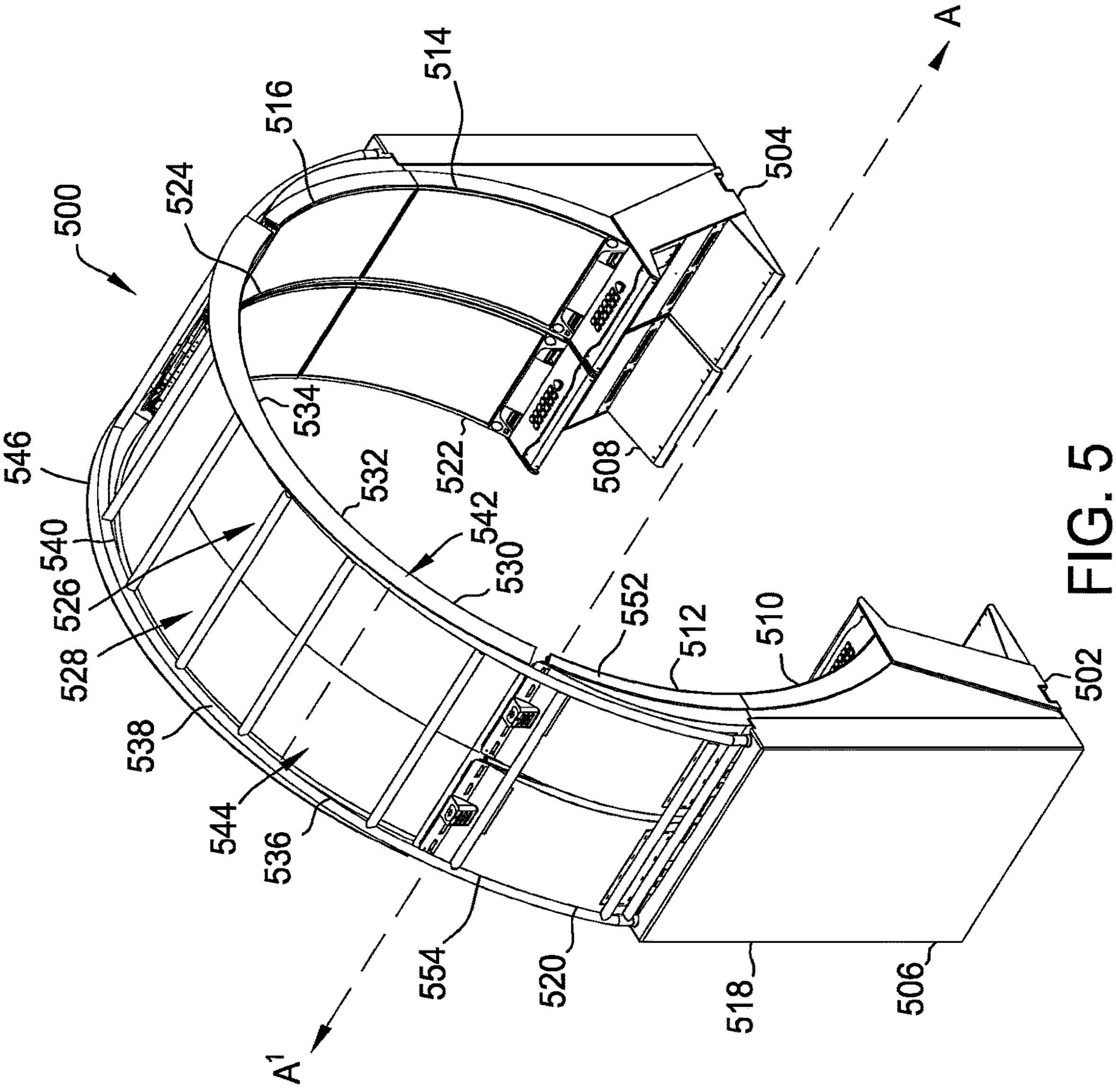
FIG. 5 is a perspective view of a second example embodiment of an EGM archway including a plurality of EGMs, as shown in FIG. 1 and FIG. 2.
Figure 6:
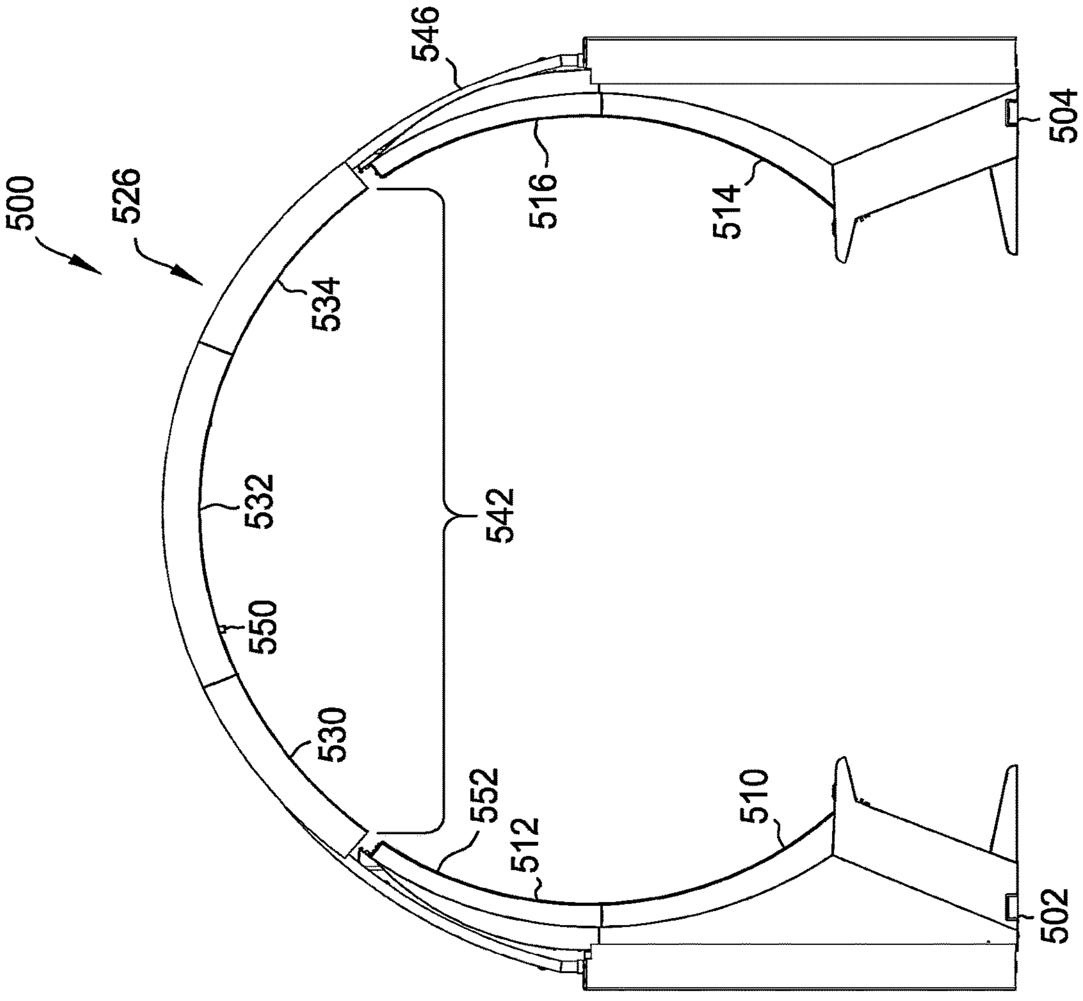
FIG. 6 is a side view of the second example embodiment of the EGM archway shown in FIG. 5.

FIG. 5 is a perspective view of a second example embodiment of an EGM archway 500. FIG. 6 is a side view of the second example embodiment of EGM archway 500. EGM archway 500 extends axially along a centerline A-A[1].

As described in additional detail below, EGM archway 500 is substantially similar to EGM archway 300, except, for example, that all overhead portions of archway 500 are, in the second example embodiment, curved. In contrast, as described above, at least some overhead portions (or overhead display devices) of archway 300 are substantially planar.

Accordingly, in the second example embodiment, EGM archway 500 includes a first EGM 502, a second EGM 504, a third EGM 506, and a fourth EGM 508. As in the first example embodiment, in the second example embodiment, first EGM 302 includes at least first curved display device 510 and second curved display device 512. Second EGM 304 includes at least first curved display device 514 and second curved display device 516. Third EGM 506 includes at least first curved display device 518 and second curved display device 520. Fourth EGM 508 includes at least first curved display device 522 and second curved display device 524. First curved display devices 510, 514, 518, and 522 may be referred as bottom display devices. Second curved display devices 512, 516, 520, and 524 may be referred as top display devices. EGMs 502, 504, 506, and 508 may be referred to as player stations.

Although in this example embodiment, each EGM 502-508 includes two curved display devices (e.g., two curved display screens), in other embodiments, any other number of curved display devices may be included in any of EGMs 502-508. Further, curved display devices 510-524 may be the same as or different from curved display devices 310-324 of EGM archway 300 in the first example embodiment. Likewise, EGMs 502-508 may be the same as or different from EGMs 302-308.

First EGM 502 and second EGM 504 may together define opposing lower or non-overhead portions of a first archway section 526, and third EGM 506 and fourth EGM 508 may together define opposing lower or non-overhead portions of a second archway section 528. As shown, first archway section 526 and second archway section 528 may abut one another, such that EGM archway 500 is substantially continuous along axis A-A[1].

In addition, it will be appreciated that any number of EGMs may be arranged along axis A-A[1] to create an archway 500 of any length along axis A-A[1]. For example, in some embodiments, archway 500 may include only a single pair of EGMs, such as EGMs 502 and 504, to define a ring-shaped archway. In another embodiment, archway 500 includes EGMs 502-508 to define a short tunnel-shaped archway having two sections 526 and 528, and in yet another embodiment, archway 500 includes greater than four EGMs to define a longer tunnel-shaped archway having, for example, greater than two sections.

In addition to the portions of each archway section 526 and 528 defined by EGMs 502-508 (e.g., the lower or substantially non-overhead portions), in various embodiments, one or more display devices may be mechanically and/or electrically coupled between first EGM 502 and second EGM 504. Likewise, one or more display devices may be mechanically and/or electrically coupled between third EGM 506 and fourth EGM 508.

More particularly, in at least the second example embodiment, a first overhead display device 530, a second overhead display device 532, and a third overhead display device 534 may extend between first EGM 502 and second EGM 504. Similarly, a fourth overhead display device 536, a fifth overhead display device 538, and a sixth overhead display device 540 may extend between third EGM 506 and fourth EGM 508.

Overhead display devices 530-540 may include a variety of shapes and may be joined or coupled, as shown and described, between respective EGMs 502-508 to define overhead portions of archway 500. Specifically, first overhead display device 530, second overhead display device 532, and third overhead display device 534 may extend between first EGM 502 and second EGM 504 to define a first overhead portion 542. Similarly, fourth overhead display device 536, fifth overhead display device 538, and sixth overhead display device 540 may extend between third EGM 506 and fourth EGM 508 to define a second overhead portion 544.

As shown, in at least one embodiment, first overhead display device 530 includes a curvature and extends from an edge of second display device 512 of first EGM 502. Likewise, third overhead display device 534 includes a curvature and extends from an edge of second display device 516 of second EGM 504. Second overhead display device 532 also includes a curvature and extends overhead between first overhead display device 530 and third overhead display device 534 to complete first section 526 of archway 500 between first EGM 502 and second EGM 504.

Similarly, fourth overhead display device 536 includes a curvature and extends from an edge of second display device 520 of third EGM 506. Likewise, sixth overhead display device 540 includes a curvature and extends from an edge of second display device 524 of fourth EGM 508. Fifth overhead display device 538 also includes a curvature and extends overhead between fourth overhead display device 536 and sixth overhead display device 540 to complete second section 528 of archway 500 between third EGM 506 and fourth EGM 508.

In addition, to suspend or mount overhead display devices 530-540, an external frame 546 may be provided. External frame 546 may attach to one or more EGMs, such as EGMs 502-508. In some embodiments, a plurality of such external frames may be provided and may attach to one or more EGMs 502-508 as well. In either case, each overhead display device 530-540 may be mechanically coupled to and supported in an overhead position by external frame 546. In other embodiments, one or more overhead display devices 530-540 may be suspended from a ceiling or overhead surface.

In yet another embodiment, overhead display devices 530-540 may be pressure-fit or snap-fit into an interlocking arrangement of overhead display devices 530-540. For example, archway 500 may be configured to function in a manner similar to an arch bridge by transferring at least some of the weight of archway 500 and its loads (if any) at least partially into a horizontal thrust that is restrained at either side by one or more abutments, where the abutments in this case include EGMs 502-508.

In some embodiments, archway 500 may include a plurality of side-mounted display devices. Although not shown in FIG. 5, side-mounted display devices may be included on one or more edges of archway 500, such as along a first edge 552 and/or along a second edge 554. As a result, in at least some embodiments, an edge 552 and/or 554 of archway 500 may also be configured to provide graphics.

In addition to the embodiments described above, display devices (curved and planar) may be added in a variety of other embodiments to achieve substantially similar effects. For example, in at least one embodiment, one or more display devices may be added in a "landscape" orientation (that is, rotated 180 degrees from the display devices 330-340 and 530-540 described above). In another embodiment, smaller or larger display devices may be implemented, whereby greater or fewer display devices may be used to create either of archway 300 or archway 500.

In some embodiments, display devices may, in addition, be added to a floor surface of either archway 300 or 500, whereby a fully immersive "tunnel" or other curving display enclosure may be created. In these embodiments, display devices making up a walking surface may be coated with or installed under a protective layer (e.g., a layer of plastic or high strength glass) to permit walking on or overtop of these surface display devices.

During operation, data, such as images and video, may be displayed on any of the EGMs 302-308 and 502-508 described herein. Likewise, images and video may be displayed on any of the display devices extending between these EGMs 302-308 and 502-508, such as any of display devices 330-340 and 530-540. As a result, images and video may be controlled to flow in any desired manner, such as between EGMs 302-308 and 502-508 over or along the display devices of either archway 300 and/or 500. In one example, a player of one EGM, such as EGM 302, may receive a winning game outcome. In response, a celebration graphic may be displayed for the player on his or her EGM 302. The same celebration graphic (or a related celebration graphic) may also be provided overhead within archway 300 for viewing by other players and/or casino patrons walking through archway 300.

Likewise, in at least some embodiments, in response to the player of EGM 302 receiving the winning game outcome, one or more bonus awards may flow or otherwise travel (e.g., as lightning bolts or as dragons carrying bonus eggs) across archway 300 and be deposited (e.g., as lightning strikes or dragons dropping the bonus eggs) on one or more other EGMs 304-308 within archway 300.

These are only a few examples and are only intended to illustrate several possibilities which may be available and/or implemented using archways 300 and 500. More generally, it will be appreciated that any of a variety of flowing graphics and animations may be provided within and on the display devices of archways 300 and 500, and that the scope of the present disclosure is not limited to the several examples provided herein.

In addition, and in various embodiments, archways 300 and/or 500 may include one or more security cameras. For example, archway 300 may include a security camera 350 (shown in FIG. 4), and archway 500 may include a security camera 550 (shown in FIG. 6). Security cameras 350 and 550 may, as shown, be positioned on an inner surface of each archway 300 and/or 500, which may allow security cameras 350 and 550 to look down on activity occurring within archways 300 and 500. This feature may facilitate observation (e.g., surveillance) of activities occurring within archways 300 and 500, which may otherwise be obscured from observation by standard ceiling-mounted casino camera systems. Cameras 350 and 550 may, in addition, be networked with and communicatively coupled to standard casino security and monitoring systems, such as via any suitable wireless and/or wired connection.

Moreover, in at least some embodiments, one or more audio output devices (e.g., speakers) may be incorporated in an archway 300 and/or 500. For example, in some embodiments, surround sound speakers may be incorporated in archways 300 and 500 to provide rich-sounding audio within archways 300 and 500.

Several EGM archways are thus described. These EGM archways may include a plurality of EGMs, arranged in spatially opposing pairs, each having one or more curved display screens. The curved display screens of each EGM pair may form a lower portion of an arc of either archway, and a plurality of curved and or planar display screens may be added between the two lower portions of either archway to complete a curvature of the archways. In addition, EGMs may be positioned side-by-side to create longer or shorter archways, such as ring-shaped and tunnel-shaped archways. In operation, a variety of animations and graphics may be displayed within the archways, and EGMs forming the archways may interact or influence each other, such as by sending graphics or game awards across the archways to one or more other EGMs.

Figure 7:
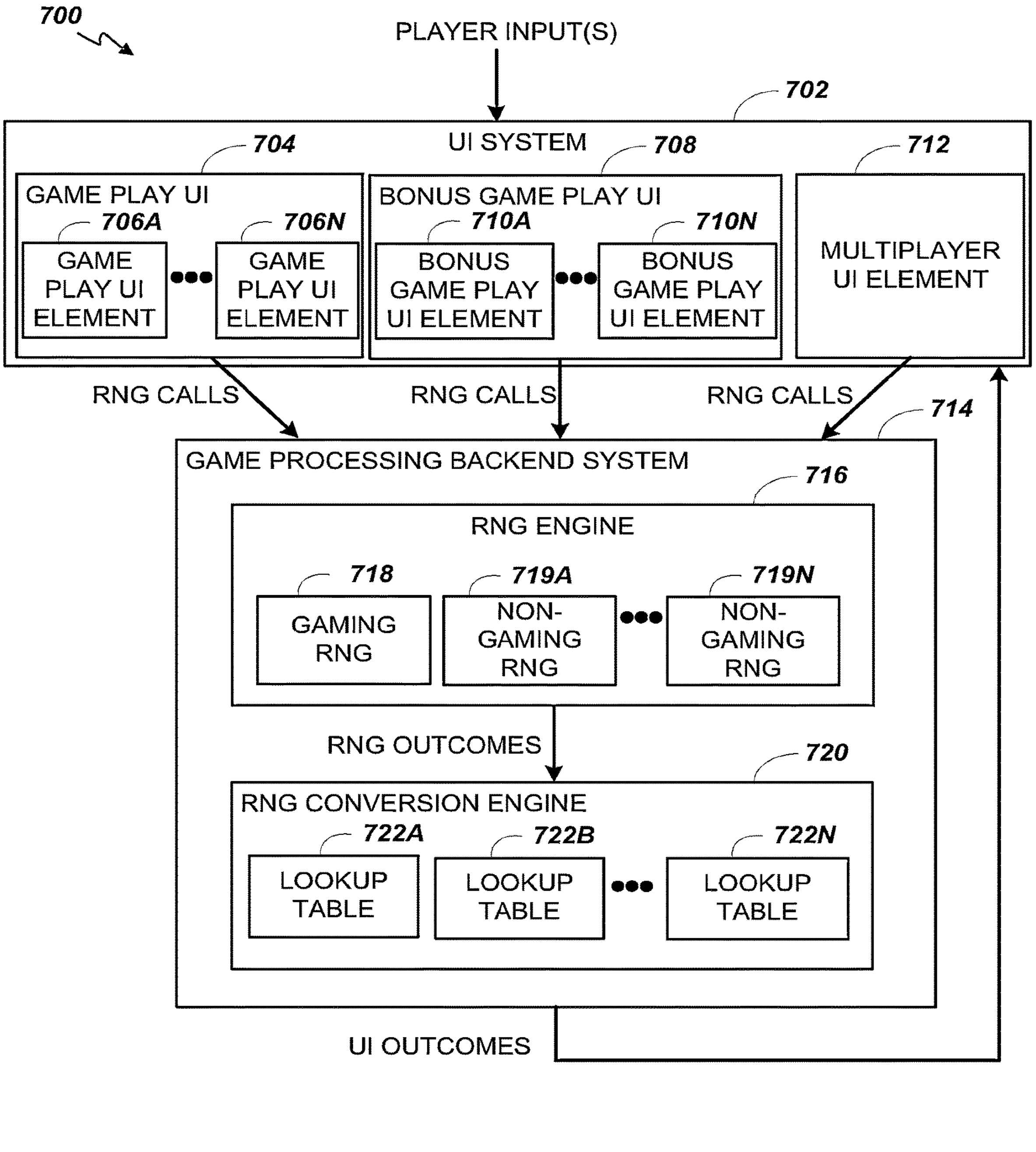
FIG. 7 illustrates, in block diagram form, an implementation of a game processing architecture algorithm that implements a game processing pipeline for the play of a game in accordance with various implementations described herein.

FIG. 7 illustrates, in block diagram form, an implementation of a game processing architecture 700 that implements a game processing pipeline for the play of a game in accordance with various implementations described herein. In an example embodiment, the game processing architecture 700 may be provided on the gaming devices 104, 200 (e.g., by game controller 202). As shown in FIG. 7, the gaming processing pipeline starts with having a UI system 702 receive one or more player inputs for the game instance. Based on the player input(s), the UI system 702 generates and sends one or more RNG calls to a game processing backend system 714. Game processing backend system 714 then processes the RNG calls with RNG engine 716 to generate one or more RNG outcomes. The RNG outcomes are then sent to the RNG conversion engine 720 to generate one or more game outcomes for the UI system 702 to display to a player. The game processing architecture 700 can implement the game processing pipeline using a gaming device, such as gaming devices 104A-104X and 200 shown in FIGS. 1 and 2, respectively. Alternatively, portions of the gaming processing architecture 700 can implement the game processing pipeline using a gaming device and one or more remote gaming devices, such as central determination gaming system server 106 shown in FIG. 1. The game processing architecture 700 could also be implemented as a multiplayer game architecture, which is discussed in more detail later with reference to FIG. 16.

The UI system 702 includes one or more UIs that a player can interact with. The UI system 702 could include one or more game play UIs 704, one or more bonus game play UIs 708, and one or more multiplayer UIs 712, where each UI type includes one or more mechanical UIs and/or graphical UIs (GUIs). In other words, game play UI 704, bonus game play UI 704, and the multiplayer UI 712 may utilize a variety of UI elements, such as mechanical UI elements (e.g., physical "spin" button or mechanical reels) and/or GUI elements (e.g., virtual reels shown on a video display or a virtual button deck) to receive player inputs and/or present game play to a player. Using FIG. 7 as an example, the different UI elements are shown as game play UI elements 706A-706N and bonus game play UI elements 710A-710N.

The game play UI 704 represents a UI that a player typically interfaces with for a base game. During a game instance of a base game, the game play UI elements 706A-706N (e.g., GUI elements depicting one or more virtual reels) are shown and/or made available to a user. In a subsequent game instance, the UI system 702 could transition out of the base game to one or more bonus games. The bonus game play UI 708 represents a UI that utilizes bonus game play UI elements 710A-710N for a player to interact with and/or view during a bonus game. In one or more implementations, at least some of the game play UI element 706A-706N are similar to the bonus game play UI elements 710A-710N. In other implementations, the game play UI element 706A-706N can differ from to the bonus game play UI elements 710A-710N.

Based on the player inputs, the UI system 702 could generate RNG calls to a game processing backend system 714. As an example, the UI system 702 could use one or more application programming interfaces (APIs) to generate the RNG calls. To process the RNG calls, the RNG engine 716 could utilize gaming RNG 718 and/or non-gaming RNGs 719A-719N. Gaming RNG 718 corresponds to RNG 212 shown in FIG. 2. As previously discussed with reference to FIG. 2, gaming RNG 718 often performs specialized and non-generic operations that comply with regulatory and/or game requirements. For example, because of regulation requirements, gaming RNG 718 could be a cryptographic random or pseudorandom number generator (PRNG) (e.g., Fortuna PRNG) that securely produces random numbers for one or more game features. To generate random numbers, gaming RNG 718 could collect random data from various sources of entropy, such as from an operating system (OS). Alternatively, non-gaming RNGs 719A-719N may not be cryptographically secure and/or be computational less expensive. Non-gaming RNGS 719A-719N can, thus, be used to generate outcomes for non-gaming purposes. As an example, non-gaming RNGs 719A-719N can generate random numbers for such as generating random messages that appear on the gaming device. The RNG conversion engine 720 processes each RNG outcome from RNG engine 716 and converts the RNG outcome to a UI outcome that is feedback to the UI system 702. As previously described, RNG conversion engine 720 translates the RNG outcome from the RNG 212 to a game outcome presented to a player. RNG conversion engine 720 utilizes one or more lookup tables 722A-722N to regulate a prize payout amount for each RNG outcome and how often the gaming device pays out the derived prize payout amounts. In one example, the RNG conversion engine 720 could utilize one lookup table to map the RNG outcome to a game outcome displayed to a player and a second lookup table as a pay table for determining the prize payout amount for each game outcome. In this example, the mapping between the RNG outcome to the game outcome controls the frequency in hitting certain prize payout amounts. Different lookup tables could be utilized depending on the different game modes, for example, a base game versus a bonus game.

Different lookup tables could be utilized depending on the different game modes. For example, a base game may be associated with one or more base game tables. In addition, bonus features associated with bonus symbols may be associated with one or more bonus feature tables. For example, as described below, if the display of a certain bonus symbol triggers the addition of extra symbol display positions, a lookup table associated with this particular bonus feature may be referenced to determine how to populate the remaining symbol display positions (e.g., to prevent having too many or too little of the same symbols on a play area). Further, bonus game events of a bonus game may also be associated with a bonus game lookup table. For example, a bonus game lookup table may be referenced to determine the weights for whether a progressive pick bonus game and/or a free spins bonus game will be triggered in the base game. The bonus game lookup table may be referenced to identify when an envelope and/or fruit will grow back or reappear on the bottom half of the tree, as displayed in private play area 812 (shown in FIG. 8). Further, the bonus game feature lookup table may be referenced to determine when a fruit and/or envelope will fall from the tree and into a player's bowl.

After generating the UI outcome, the game processing backend system 714 sends the UI outcome to the UI system 702. Examples of UI outcomes are symbols to display on a video reel or reel stops for a mechanical reel. In one example, if the UI outcome is for a base game, the UI system 702 updates one or more game play UI elements 706A-706N, such as symbols, for the game play UI 704. In another example, if the UI outcome is for a bonus game, the UI system could update one or more bonus game play UI elements 710A-710N (e.g., symbols) for the bonus game play UI 708. In response to the updating the appropriate UI, the player may subsequently provide additional player inputs to initiate a subsequent game instance that progresses through the game processing pipeline.

Throughout this specification and in the claims, the terms "primary game" and "bonus game" refer to a game session that includes more than one game event or, simply, one or more games. The primary game may correspond to a primary or "base" game, as opposed to a bonus game, as described below. The primary game may be initiated in response to a wager or credit being received by or transferred to gaming machine 104A (shown in FIG. 1). The primary game (as well as one or more games comprising the primary game) may also be initiated by other game events including, for example, a player selecting a "spin" button, a start button, a deal button, or any other such input selector designated for initiating a game session. The primary game may be terminated voluntarily in response to an input by the player indicating that the player wishes to stop the game or automatically by the gaming device in response to a termination event, such as a zero credit balance in the reel game.

Further, as used herein, the terms "bonus game," "feature game," "secondary game," and "bonus game session" refer generally to a game or a component of a game involving procedures in addition to the primary game. The feature game may be initiated during play of the primary game and in response to a particular condition occurring during the primary game (e.g., a trigger condition). The feature game may include a plurality of feature game events. For example, where the primary game includes a slot machine game, the feature game may allow players a possibility of winning more than the pay table for the primary game indicates. Typically, a feature game outcome may depend upon a particular symbol being displayed when one of a plurality of final game events takes place. In some embodiments, the outcome of the feature game may be unrelated to the outcome of the primary game.

Figure 8:
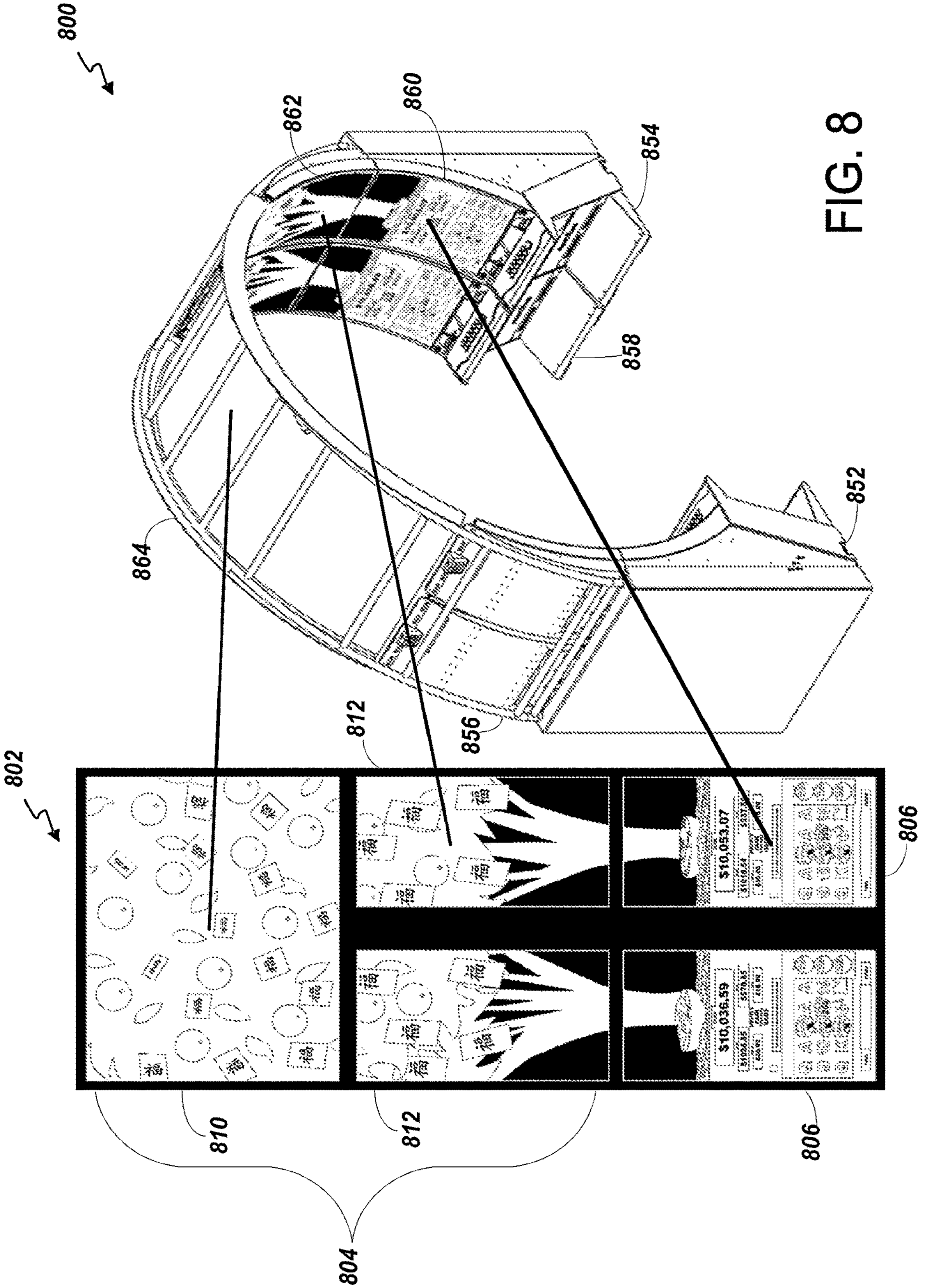
FIG. 8 is a diagram illustrating the EGM archway shown at FIG. 5 during gameplay of an example base game.

FIG. 8 is a diagram illustrating a multiplayer gaming environment 800 during gameplay of an example base game. Environment 800 includes an EGM archway, such as EGM archway 500 (shown in FIG. 5) or EGM archway 300 (shown in FIG. 3). As described above, EGM archway 500 is substantially similar to EGM archway 300 (shown in FIG. 3), except, for example, that the overhead portions of archway 500 are curved as opposed to the overhead portions of archway 300, which are substantially planar. In FIG. 8, the EGM archway includes a plurality of player stations (e.g., EGMs). The EGM archway may include a first player station 852 associated with a first player, a second player station 854 associated with a second player, a third player station 856 associated with a third player, and a fourth player station 858 associated with a fourth player. Player stations 852-858 may be similar to or the same as EGMs 302-308 (shown in FIG. 3) and EGMs 502-508 (shown in FIG. 5). Each player station 852-858 includes a bottom display device 860 and a top display device 862. The example base game is a multiplayer metamorphic game. As described herein, a metamorphic game is a game where a cumulative result of a series of plays triggers free spins, features, games, and other prizes. More specifically, metamorphic games provide visual indications to players that an event, such as a triggering event, has not yet occurred and/or is occurring soon based on visual changes of game features (e.g., fruit growing on a tree, coins accumulating in a bowl).

In an example embodiment, FIG. 8 illustrates an example play area 802 for the example group-play metamorphic base game. Play area 802 includes a communal play area 804 and personal play areas 806. Communal play area 804 includes a public play area 810 displayed on a communal display area 864 and private play areas 812 displayed at each player station 852-858. More specifically, each player station 852-858 includes a personal play area 806 and a private play area 812. Personal play areas 806 are displayed by bottom display devices and private play areas 812 are displayed by top display devices. Public play area 810 is displayed on communal display area 864 and is shared among player stations. In an example embodiment, communal play area 804 includes one or more communal game elements that are a part of a group metamorphic game element (e.g., a group metamorphic graphical element) and/or a multiplayer game that participating player stations 852-858 interact with. As shown in FIG. 8, the communal game elements (e.g., envelopes and fruits) are part of the group metamorphic game element (e.g., money tree that grows or loses envelopes and fruits) that dynamically changes over time. The public play area 810 includes communal game elements that are available to be won by any participating player station 852-858. The personal play area 806 includes communal game elements available to be won by only the associated player station just below that private play area 812.

In examples described herein, a metamorphic graphical element (e.g., a metamorphic game element) can indicate when a particular multiplayer game feature, such as, for example, those described in FIGS. 9-13 below, will likely be activated. The metamorphic graphical element has a current state with any of multiple possible state values, corresponding to different depictions of the metamorphic graphical element on a progression from an initial state value to a final state value (e.g., empty to full; cold to hot; dark to light; small to large; or vice versa). Upon initialization or activation of a game feature, the current state of the metamorphic graphical element is set to the initial state value. Thereafter, after multiple rounds of gameplay, the current state of the metamorphic graphical element can advance to a higher state value, visually indicating the opportunity to activate a game feature. For example, over multiple rounds of gameplay, the leaves of a fortune tree may change colors (e.g., from light green to dark green to red and/or orange) to visually indicate to players when a fruit, envelope, and/or coin is likely to fall from the tree. In another example, fruit on the fortune tree may grow in size or change in color (indicating ripeness) over multiple rounds of gameplay to visually indicate to players when the fruit is likely to fall from the tree.

In some example implementations, the metamorphic graphical element is an individual metamorphic graphical element, such as, for example, a bowl, bag, or other container, and the multiple state values correspond to different levels of fullness of the container. Upon activation of a particular game feature, the container is depicted as empty or as having minimal fullness. Thereafter, the container can advance to a higher fullness, at least until a maximal fullness has been reached. The individual metamorphic graphical element is specific to each player's personal play area 806 and is configured to eventually trigger and assign an award to an individual player. In some example implementations, group metamorphic graphical elements, such as, for example, a fortune tree, may additionally or alternatively be provided. Group metamorphic graphical elements are configured to interact with multiple participating player stations 852-858 (e.g., displaying the state of metamorphic graphical elements that could be achieved or otherwise applied to any or all of the player stations 852-858). For example, the tree may include leaves, envelopes, and/or fruits. In these implementations, to visually indicate the multiple state values, the leaves may change colors, the coins and envelopes may shake, and/or the fruit may change in size and color or wobble to depict different levels of progression.

Approaches described herein address the technical problem of how to manage interaction between a group metamorphic graphical element and an individual metamorphic element. The approaches provide a way to visually convey when a particular game feature will likely be activated, by adjusting a metamorphic graphical element throughout multiple rounds of gameplay, and by resetting the metamorphic graphical element after a particular game feature has been activated. Further, providing a shared display device, such as the communal display area 864, in conjunction with the player stations 852-858 facilitates the ability to provide group metamorphic graphical elements. The shared nature of the communal display area 864 provides a visual indication to the participating players that the state of the group metamorphic graphical elements applies to multiple player stations 852-858.

In terms of technical effects, innovative interactions between a group metamorphic graphical element and an individual metamorphic graphical element in a multiplayer game represent improvements in the technical area of electronic gaming software and provide new technology, in that they improve usability of electronic gaming devices by enhancing the user experience for players, extending player time on the electronic gaming devices, and maintaining the interest of current players in the electronic gaming devices. In some example implementations, the progression of a metamorphic graphical element is visible to players. In particular, the interaction between the group metamorphic graphical element and the individual metamorphic graphical element at each electronic gaming device provides a build up to triggering, for example, multiplayer features and bonus games, which may reward players for extended play on an electronic gaming device. These embodiments are thus not merely new game rules or new display patterns. Furthermore, by managing lookup tables and/or other aspects of random number generation events for activating various multiplayer game features and bonus games, game play can be kept fair and consistent with regulations while also enabling variation of game volatility for a designated level of RTP for a game.

The detailed description presents innovations in user interface ("UI") features of electronic gaming devices, as well as innovations in features of backend processing to implement the UI features. In particular, the innovations relate to use of metamorphic graphical elements. In some example implementations, by providing visual feedback about when a particular game feature may be activated, the innovations improve usability of electronic gaming devices by enhancing the user experience for players, extending player time on the electronic gaming devices, and maintaining the interest of current players in the electronic gaming devices.

In an example embodiment, the communal display area 864 includes one or more overhead display devices (e.g., overhead display devices 330-340, shown in FIG. 3, and overhead display devices 530-540, shown in FIG. 5) that define an overhead portion between the player stations, such as first overhead portion 342 and second overhead portion 344 (both shown in FIG. 3) and first overhead portion 542 and second overhead portion 544 (both shown in FIG. 5). In other embodiments, other display devices may be used in lieu of the overhead display devices 330-340, 530-540. For example, any of the public play area 810 or private play areas 812 may be provided on a multiplayer public display device (e.g., a flat panel display) positioned above the participating gaming devices 200. In one embodiment, a flat panel display device is positioned above a row of multiple gaming devices 200 and used as the public play area 810, the secondary display device 242 of the gaming device 200 is used as the private play area 812 for that gaming device 200, and the primary display device 240 is used as the personal play area 806. In another embodiment, a curved, circular display device is positioned above a bank of four gaming devices 200 aligned in quadrants and sharing the circular display as the public play area 810. In some embodiments, the public play area 810 may provide a side view or back view of the public play area 810.

In some embodiments, how the group metamorphic game element and/or what communal game elements the public play area 810 displays may dynamically adjust based on a determined bank configuration or hardware profile of the display hardware for the public play area 810, the participating player stations 852-858, the form factor of the player stations 852-858, or the number of active players. Using FIG. 8 as an example, the bank configuration corresponds to an EGM archway 500, where the public play area 810 is located above the player stations 852-858. Because players would need to look up to view the public play area 810, the public play area 810 displays the group metamorphic game elements using a bottom-to-top perspective. In other form factors, where the public play area 810 is located at a different position relative to the player stations 852-858, the public play area 810 could display the group metamorphic game element using other perspectives, such as a front-to-back perspective, back-to-front, or a side perspective. In some embodiments, the public play area 810 may expand or contract based on the number and position of active players. For example, in the money tree example, the tree may expand (e.g., leaf out) into a display area above a particular player station 852-858 when a player first starts a gaming session and may retract (e.g., wither) when the player ends a gaming session, or after a predetermined amount of time after the end of a gaming session.

FIG. 8 illustrates communal play area 804 and personal play areas 806 for an example multiplayer reel-based base game. In an example embodiment, public play area 810 is presented by communal display area 864. Public play area 810 includes a money tree with fruit, such as tangerines, leaves, and lucky envelopes that grow from buds. For example, if a first player at first player station 852 and a second player at second player station 854 are playing the example base game together, first overhead portion 342, 542 may present public play area 810. Private play area 812 is presented by top display device 862 of each player station. Private play area 812 includes a tree trunk and branches. In particular, private play area 812 displays the tree of public play area 810 divided across two player stations. In embodiments where more than two players are playing the example base game, the money tree of public play area 810 is divided across multiple player stations. Personal play area 806 is presented by bottom display device 860 of each player station. Personal play area 806 includes the base of the tree and a bowl. Personal play area 806 further includes a plurality of reels that may spin and stop (e.g., with physical reels) or may be simulated to spin and stop (e.g., with virtual reels) in response to a player submitting a wager and initiating the base game. In an example base game, players try to fill their bowl with coins to trigger one of the communal game elements described below.

In an example embodiment, the example multiplayer game includes both a group metamorphic game element and an individual metamorphic game element located at each of the player stations. The individual metamorphic game element is separate and independent from the group metamorphic game element and can vary in the readiness to award a prize at an individual player station. In an example embodiment, players do not influence the winnings of other players participating in the multiplayer game. In one embodiment, an RNG on each player's EGM is utilized to transfer communal game elements to an individual metamorphic game element displayed on a respective player's EGM. Alternatively, in other embodiments, players influence the winnings of other players participating in the multiplayer game. In these embodiments, a single player's winnings may provide an ancillary benefit to other participating to encourage group play of the multiplayer game. In an example embodiment, communal display area 864 displays the branches of a money tree above all the players (at each play station) where players and observers can see more and more coins, envelopes, and fruit, such as mandarin oranges (to represent luck and wealth), growing on the tree as a group metamorphic game element. In an example embodiment, the group metamorphic game element feeds into the individual metamorphic game element at the player stations. For example, when the group metamorphic game element is triggered, all players may receive a portion of the bonus items (e.g., coins, credit awards, wild symbols), relative to their bet and contribution.

In some embodiments, individual metamorphic game elements from player stations may feed into the group metamorphic game element. In these embodiments, an individual player's actions at a given player station affect the group metamorphic game element. For example, players may collect fireworks in an example base game and shoot them up to the communal display area 864 to allow all the players to win as sparks fall. In some embodiments, the reels of a player's personal play area 806 affect the individual metamorphic game element and/or the group metamorphic game element. For example, bills, credit values, credit awards, wild symbols, and/or other symbols may "fly" off the reels of a player's personal play area 806 and up into the money tree. In some embodiments, a dragon travels from the display device of one player station to the display device of another player station and awards a prize when the dragon stops. In some embodiments, a reel or a wheel may land values on two player stations on opposing sides, such as first player station 852 and second player station 854.

The individual metamorphic game element is configured to eventually trigger and award a player an award or enhance a player's chance of winning. In an example embodiment, the individual metamorphic element is portrayed as a basket or bowl that receives fruit, lucky envelopes, coins, and/or other symbols that fall from a tree. In this example, once the bowl reaches a certain fullness (e.g., the bowl accumulates with symbols), the contents of the bowl, such as fruit or coins, may fall from the bowl and onto the reels of a player's personal play area 806 to trigger a bonus or increase the amount of a win and/or the likelihood of winning an award. Symbols, such as envelopes, may fall and create mystery prizes that are displayed on the reels. In some embodiments, triggering of a multiplayer feature caused by a communal game element may be a fixed, pre-determined chance. In other embodiments, triggering of a multiplayer feature may be based on the number of active players. For example, the odds for triggering the multiplayer feature could be 1/400 if one player is at the bank, 1/200 if two players are at a bank, and 1/100 if four players are at the bank.

In some embodiments, award amounts for community bonuses could be based on award buckets. For example, award buckets could allow the triggered community bonus feature to award the players different award amounts. The award for a community bonus could be dynamically adjusted for certain types of players or to ensure fairness. Award buckets could include, for example, personal award buckets, group award buckets, common award buckets, and progressive buckets. Personal award buckets may be based on, for example, recent bet data (e.g., how much a player has bet over a gaming session, recent period of time), player status (e.g., loyalty level), or other player- or game-specific attributes. For example, the larger the bet a player uses and the amount of time a player has played can factor into how much game equity a player builds with the personal award bucket. In some embodiments, the personal award bucket may be tied to the gaming device 200 (e.g., forfeit when the player ends their gaming session). In other embodiments, the personal award bucket may be tied to the player (e.g., using the player tracking system) and, as such, may follow the player to other gaming devices 200. The group award bucket represents a shared bonus pool that gets distributed amongst all players in the group (e.g., a progressive or commonly owned pot). In one embodiment, a player could receive an equal distribution of the group award bucket. The progressive bucket accumulates contributions to one or more progressives to pay out when a player hits a progressive. The common award bucket corresponds to an accumulation prize, jackpot, or mystery prize to which a particular player has contributed, but then cashes out before the community bonus was triggered.

In some embodiments, the EGM archway may include one or more haptics, cameras, and sensors to activate animations (e.g., tree shaking, fruit and/or coins swaying on the tree) and/or sounds (e.g., wind chimes, leaves rustling) when people walk near or through the tunnel created by the EGM archway. In some embodiments, one or more haptics, cameras, and sensors may be used to allow players to feel something approaching when a bonus is close to being hit. Cameras may further be used to change the player views/ scenes (e.g., first person shooter game). For example, the camera perspective of the money tree may shift from a view that looks at the money tree bottom to top to a front view of the tree. In an example embodiment, the leaves of the money tree change color when a nearby fruit, coin, envelope, and/or other symbol are ready to fall. For example, leaves may change from green to yellow to red to show that a multi-player feature described below (a coin feature, a bowl explosion feature, an envelope feature, and a fruit feature) is close to being activated.

In some embodiments, a tornado feature activates, causing "money leaves," such as bills, to spin around the money tree in communal display area 864. When the tornado stops, bills may fall onto personal play areas 806 of the player stations to award the players. In this embodiment, the volume of bills that fall on each personal play area 806 depends on the amount each player bet (e.g., players who bet more and/or max receive a greater volume of bills as compared to those who bet less).

FIGS. 9-13, as described below, depict example screenshots of the personal play area 806, as displayed in the bottom display device 860 of a single player station 852-858. More specifically, FIGS. 9-13 illustrate examples of communal game elements that are activated in a player's personal play area 806 during play of the example base game. In an example embodiment, a player may place a wager using, for example, a "spin" or "play" button. In response to a player wager, the reels of personal play area 806 are simulated to spin and stop, whereby symbols from the reels may be displayed in a plurality of symbol display positions. A player may be awarded based on the reel symbol outcomes. During gameplay of the base game, the tree and leaves, as displayed by communal play area 804 (shown in FIG. 8) may sway in real-time. In an example embodiment, the tree randomly shakes during gameplay of the base game to transfer a communal game element to the individual metamorphic game element. Afterwards, the communal game element could cause one of the following multiplayer features described below (a coin feature, a bowl explosion feature, an envelope feature, and a fruit feature) to be randomly activated. In FIGS. 9-13, scatter symbols are depicted as symbols with credit values. When a predetermined number of scatter symbols appears on the reels of personal play area 806, one of two bonus games, such as progressive pick bonus game (described below with reference to FIGS. 14A and 14B) and free spins bonus game (described below with reference to FIGS. 15A-15C), may be triggered.

Figure 9:
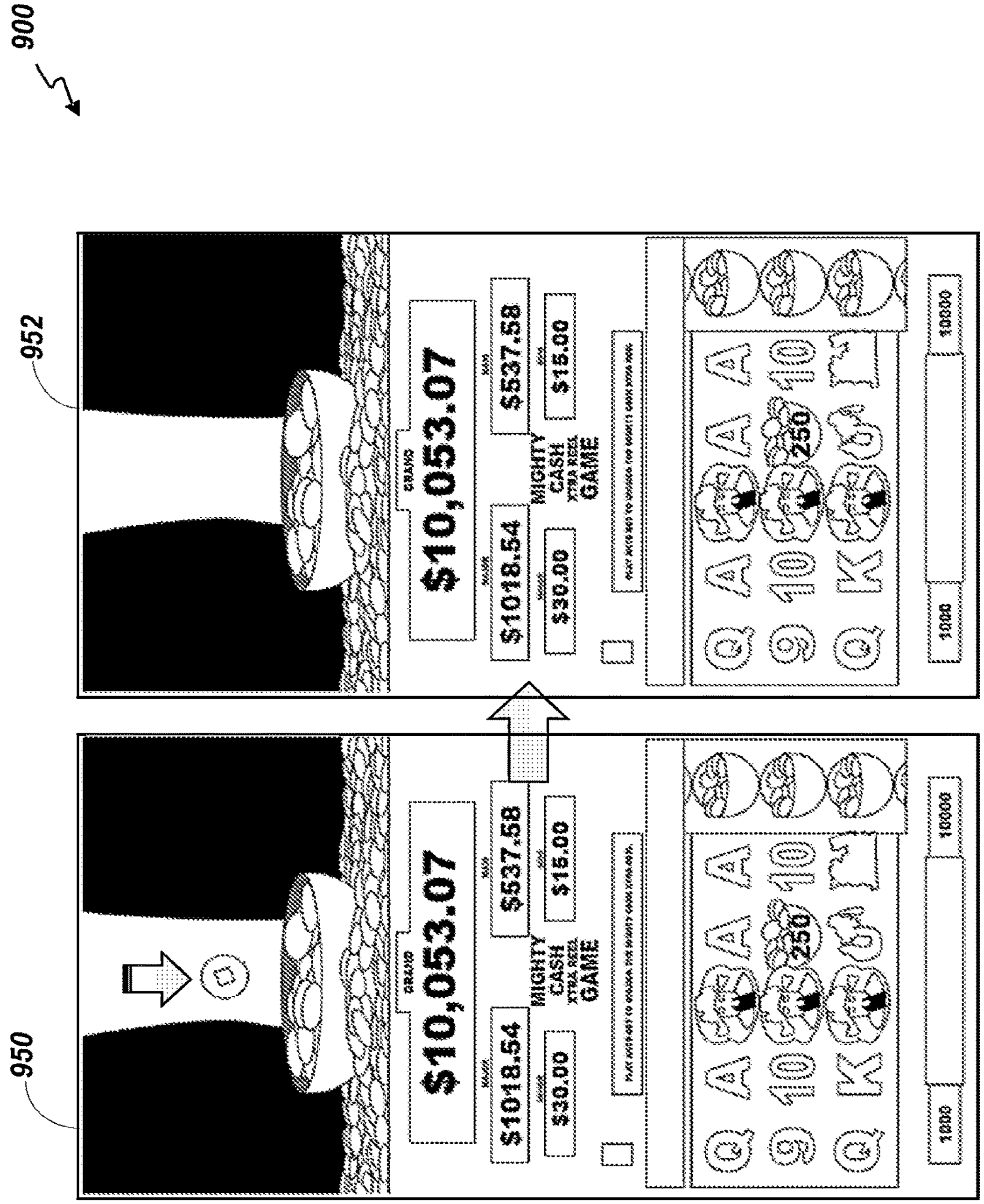
FIG. 9 is a diagram illustrating game play progression when a first game feature is activated in the example base game.

FIG. 9 depicts an example multiplayer game play progression 900 for an example game instance of the base game when a multiplayer coin feature is activated. During gameplay, the reels may be spun and stopped to display a set of symbols which may be used to determine an outcome to the game. When the multiplayer coin feature is activated, the group metamorphic game element (e.g., tree) displayed in communal play area 804 shakes to drop communal game elements (e.g., coins) into the individual metamorphic game element (e.g., bowl) displayed in personal play area 806, as illustrated by first coin screenshot 950 and second coin screenshot 952. A predetermined number of coins, such as, for example, three coins, may fall from the tree and into a player's bowl. In an example embodiment, with each round of gameplay, a player's bowl gradually fills with coins until a maximum coin threshold is reached. In some embodiments, the bowl is empty (of coins) when a player first initiates gameplay of the base game. In other embodiments, the bowl contains a minimum number of coins at all times regardless of the game play progression. In certain embodiments, landing a wild symbol on the plurality of reels triggers three coins up to be tossed up into the player's metamorphic bowl, thereby allowing the player to collect coins from multiple places, including the tree.

Figure 10:
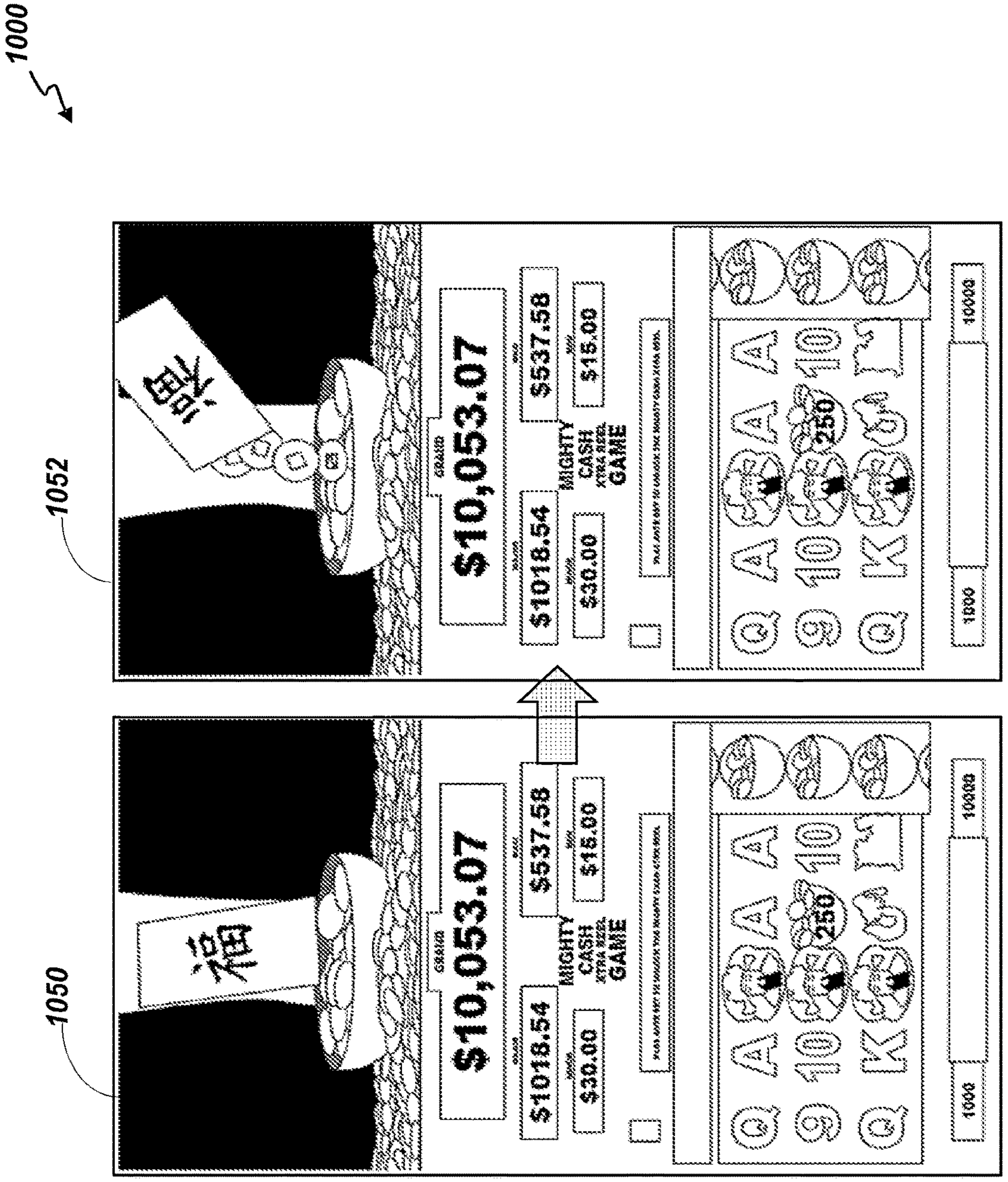
FIG. 10 is a diagram illustrating game play progression when a second game feature is activated in the example base game.

FIG. 10 depicts another multiplayer game play progression 1000 for an example game instance of the base game when an envelope coin feature is activated. During gameplay, the reels may be spun and stopped to display a set of symbols which may be used to determine an outcome to the game. When the envelope coin feature is activated, an envelope on the tree displayed in communal play area 804 randomly shakes and proceeds to fall into the bowl displayed in personal play area 806, as shown in first envelope coin screenshot 1050. In some embodiments, the envelope falls from the tree and suspends (hovers) over the bowl. In an example embodiment, the envelope proceeds to tilt and spill its contents into the bowl. As shown in second envelope coin screenshot 1052, coins spill out from the envelope and into the bowl. A predetermined number of coins, such as, for example, six coins, may spill out of the envelope and into the player's bowl. The envelope may subsequently revert from a tilted position to an upright position and transition out of personal play area 806.

Figure 11:
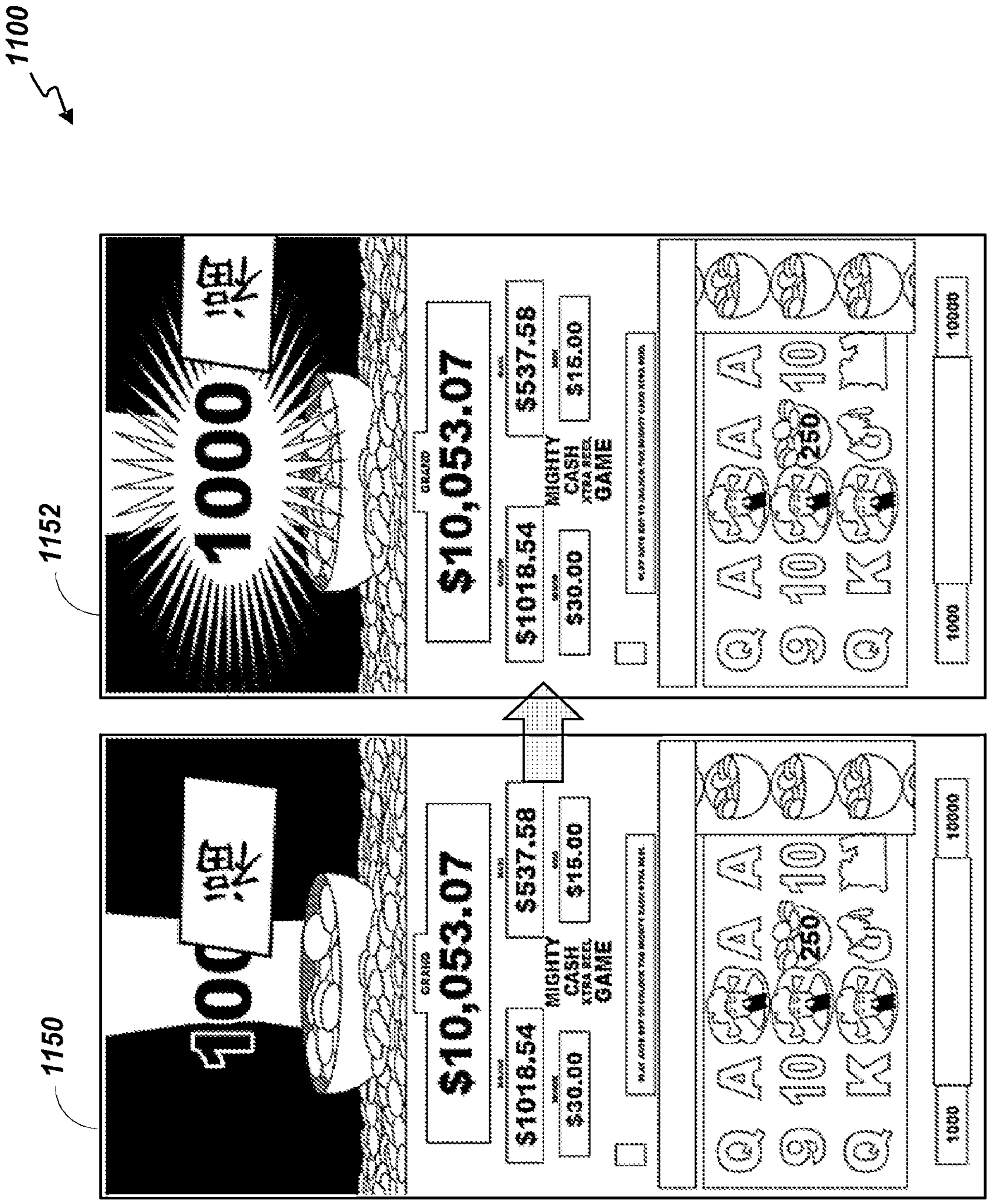
FIG. 11 is a diagram illustrating game play progression when a third game feature is activated in the example base game.

FIG. 11 depicts another multiplayer game play progression 1100 for an example game instance of the base game when an envelope award feature is activated. Similar to the envelope coin feature described in FIG. 10, when the envelope award feature is activated, an envelope on the tree displayed in communal play area 804 randomly shakes. The envelope falls from the tree and suspends (hovers) over the bowl. The envelope tilts to reveal its contents. In FIG. 10, the envelope tilts to reveal coins. In FIG. 11, the envelope tilts to reveal a credit award. As shown in first envelope award screenshot 1150 and second envelope award screenshot 1152, the envelope may move to the side of personal play area 806 to reveal the value of the credit award before the envelope moves or fades away from personal play area 806. In certain embodiments, at random times throughout the multiplayer game, after first releasing coins, the envelope rotates back up to a level position then slides right to reveal an additional award of credits.

With reference to FIGS. 10 and 11, in an example embodiment, envelopes may fall from the tree and into a player's personal play area 806 to award coins or credit awards to the player. In some embodiments, an envelope that falls from the money tree may be empty. In some embodiments, an envelope that falls from the money tree may award a player both coins and credit awards. In an example embodiment, the envelope grows back on the tree. The envelope may "grow back" on the tree by either reappearing on the tree as an entire envelope or by reappearing on the tree in increments over time until a fully formed envelope is present on the tree. The amount of time for the envelope to reappear on the tree may vary. In some embodiments, envelopes may always be present on the top of the tree, as display in public play area 810. In these embodiments, it may take time for an envelope to be present on the lower half of the tree, as displayed in private play areas 812 of player stations.

Figure 12A:
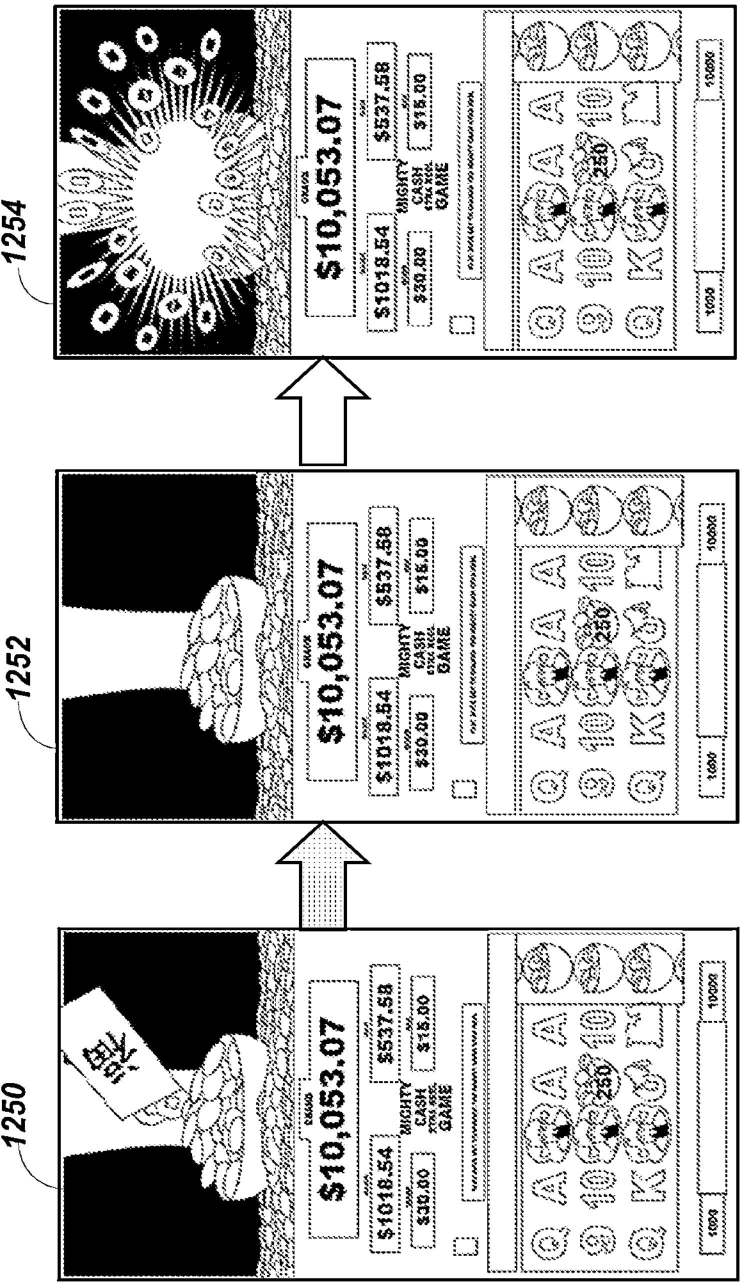
FIGS. 12A and 12B are diagrams illustrating game play progression when a fourth game feature is activated in the example base game.
Figure 12B:
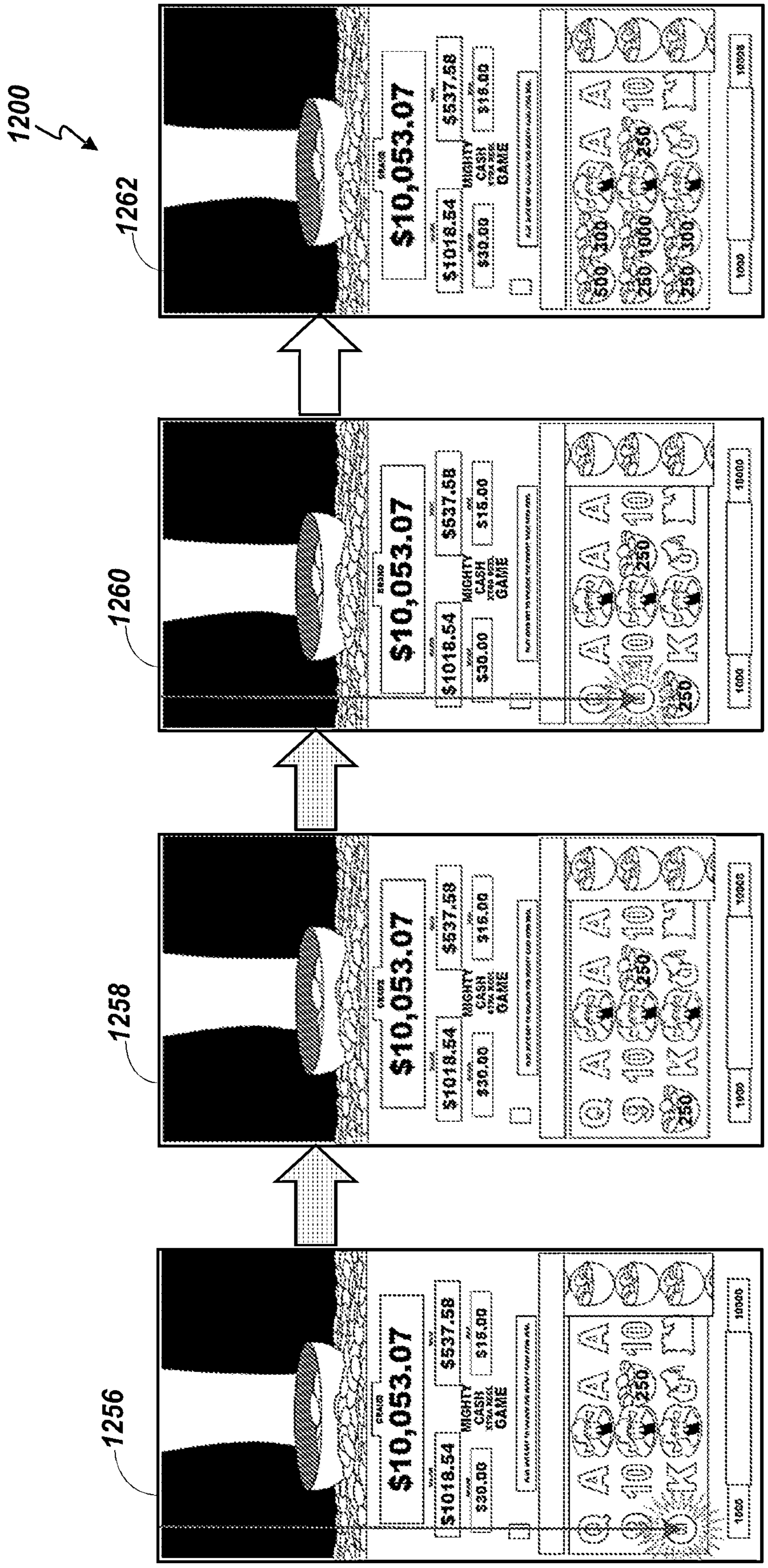

FIGS. 12A and 12B depict an example multiplayer game play progression 1200 for an example game instance of the base game when a multiplayer bowl explosion feature is activated. Any time coins are added to the bowl (as described above with reference to FIGS. 9 and 10), a random Boolean (true or false) value is drawn. If the value is true, the bowl explosion feature is activated and a progressive pick bonus game is triggered. Otherwise, coins continue to accumulate in the bowl with each round of gameplay. As shown in first explosion screenshot 1250, the envelope coin feature, as described above in FIG. 10, is activated, and coins are added to a player's bowl. With reference to second explosion screenshot 1252 and third explosion screenshot 1254, there is a one to two second delay after the coins land in the player's bowl before the bowl explodes. When the multiplayer bowl explosion feature is activated and the bowl explodes, coins are released from the bowl (e.g., scatter away from the bowl). The coins may subsequently move or fade away from personal play area 806. In some embodiments, all of the coins in the bowl are released from the bowl. In some embodiments, a portion of the coins in the bowl are released from the bowl when the bowl explodes. In some embodiments, when the bowl explodes, one or more coins may land in another player's bowl, as an ancillary benefit to the other players playing in the multiplayer base game.

Figure 14A:
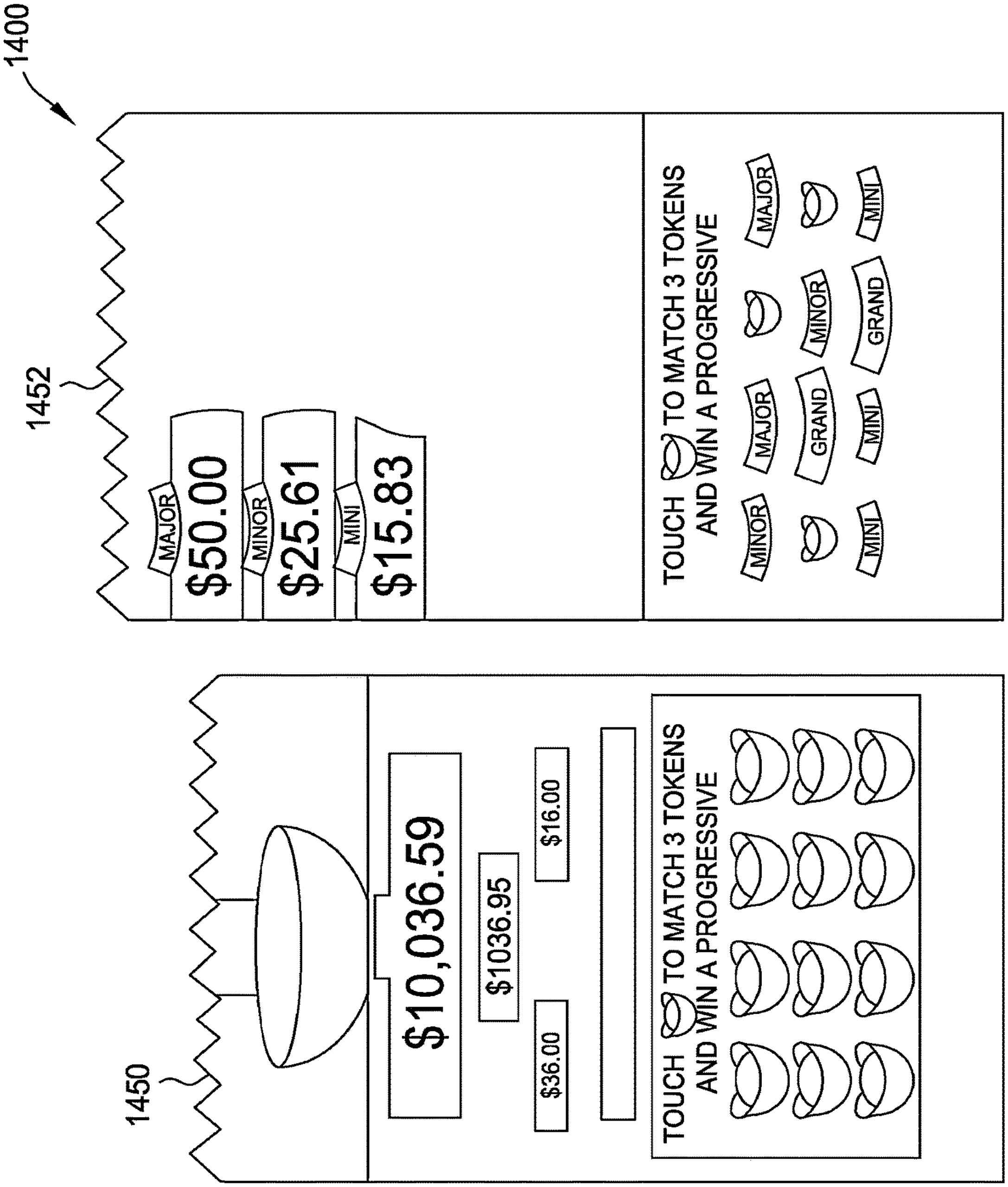
FIGS. 14A and 14B are diagrams illustrating game play progression for an example progressive pick bonus game.
Figure 14B:
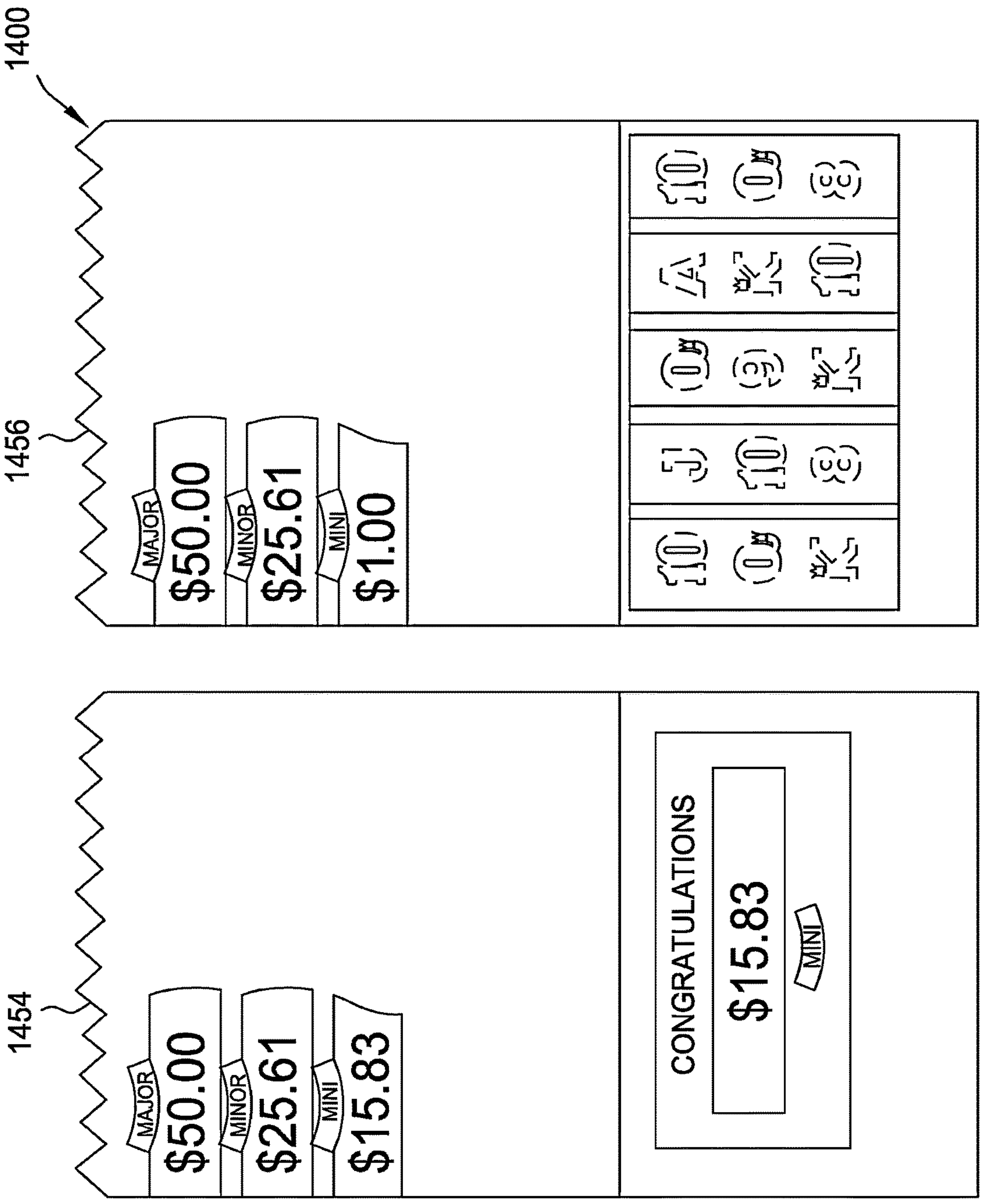

In one example embodiment, the progressive pick bonus game, as described below in FIGS. 14A and 14B, is triggered solely by the player's bowl exploding. In this example embodiment, no scatter symbols are required to trigger the progressive pick bonus game, and the coins do not drop into the symbol display positions.

In another example embodiment, after the player's bowl explodes, six or more coins land on the reels of personal play area 806. More specifically, these coins land in symbol positions having non-scatter symbols (referred to herein as "non-scatter symbol positions"). The coins may be overlaid on top of the non-scatter symbols. Upon landing on the non-scatter symbol positions, the coins turn into scatter symbols, as shown in FIG. 12B. Fourth explosion screenshot 1256 and sixth explosion screenshot 1260 illustrate coins falling onto the non-scatter symbol positions. Fifth explosion screenshot 1258 and seventh explosion screenshot 1262 illustrate the coins converting into scatter symbols. As shown in seventh explosion screenshot 1262, the reels of personal play area 806 have seven scatter symbols, thereby triggering the progressive pick bonus game, as described below in FIGS. 14A and 14B. Although the progressive pick bonus game is described herein as requiring seven scatter symbols to be triggered, any suitable number of scatter symbols may be used to trigger the progressive pick bonus game from the bowl explosion feature.

Figure 13:
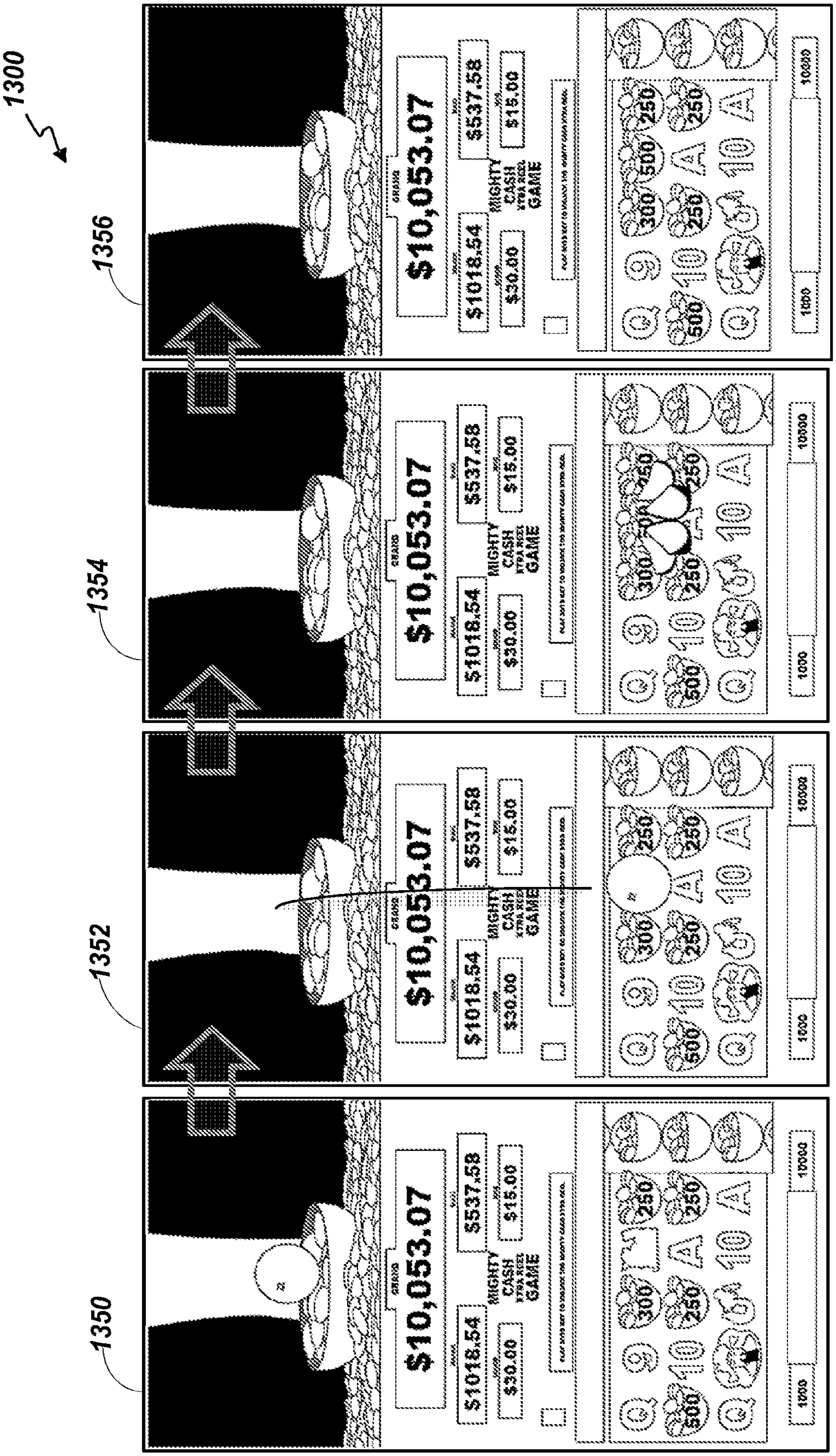
FIG. 13 is a diagram illustrating game play progression when a fifth game feature is activated in the example base game.

FIG. 13 depicts an example multiplayer game play progression 1300 for an example game instance of the base game when a multiplayer fruit feature is activated. The fruit feature acts as a staged benefit, or "pending bonus," that may be subsequently triggered by a particular "pending bonus trigger condition." The fruit feature gives a player the chance to trigger the bonus game by converting a non-scatter symbol into a scatter symbol. During gameplay, the reels may be spun and stopped to display a set of symbols which may be used to determine an outcome to the game. When the multiplayer fruit feature is activated, a fruit, such as a tangerine, falls from the tree displayed in communal play area 804 and lands in a bowl of a player's personal play area 806. More specifically, the fruit lands in the bowl without displacing any of the coins within the bowl, thereby staging a potential benefit for later activation. In an example embodiment, a player's bowl may hold up to one fruit at any given time. During subsequent rounds of gameplay, any coins that fall from the tree land in the bowl without reacting to (e.g., bouncing off) the fruit inside the bowl. In particular, the fruit sits on top of the coins within the bowl, such that subsequent coins that fall from the tree fill the bowl, thereby elevating the fruit inside the bowl accordingly.

The fruit sits inside the bowl and does not move down onto the reels until the fruit can provide a benefit to the player. The fruit may sit in the bowl for a long time. Alternatively, the fruit may fall from the money tree into the player's bowl, and immediately move from the player's bowl onto the reels. In some embodiments, the fruit may fall from the player's bowl and onto the reels to change the original outcome. In some embodiments, the fruit may wobble and fall from the player's bowl and onto a symbol position above one of the reels to allow the player to win the landed outcome and trigger the free spins bonus game (as described below in FIGS. 15A-15C). In an example embodiment, the free spins bonus game is triggered when a threshold number of scatter symbols is displayed on the plurality of reels. In one example embodiment, the fruit sits inside the bowl until the player needs one additional scatter symbol to trigger the bonus game. In some embodiments, the fruit may fall from the bowl to enhance a bonus that was already triggered. For example, if a player lands three scatter symbols and triggers the free spins bonus game, a fruit, such as, for example, an orange or tangerine, may fall on the reels and land on a symbol position, thereby causing four values instead of three values to be added to a "repeat fortune" meter (as described below in FIGS. 15A-15C). In another embodiment, the fruit animates to indicate that it might fall when one additional symbol is needed. However, the animated fruit does not always fall. The fruit can also fall when more than a threshold value lands if that delivers an additional benefit. For example, a player gets three free spins for three scatters, but four free spins for four scatters or five free spins for five scatters. The fruit might also fall if three or four scatter symbols are displayed, thereby providing an additional benefit of one spin.

In an example embodiment, the pending bonus trigger condition is achieved when two or more scatter symbols appear on the reels. As shown in first fruit screenshot 1350, a player has five scatter symbols on the reels of personal play area 806 after a round of gameplay. As shown in second fruit screenshot 1352, the fruit from the player's bowl subsequently falls into a symbol position having a non-scatter symbol. The fruit may be overlaid on top of the non-scatter symbol. As shown in third fruit screenshot 1354 and fourth fruit screenshot 1356, the fruit subsequently splits open to reveal a scatter symbol in its place. After the fruit splits open, the fruit may fall away or alternatively, fades out of the reels of personal play area 806. In some embodiments, the fruit changes colors (e.g., to a golden color) instead of splitting open. As shown in fourth fruit screenshot 1356, the player now has six trigger symbols, thereby triggering a bonus game. Although six scatter symbols are described as triggering a bonus game in this example, any suitable number of scatter symbols may trigger the bonus game. In an example embodiment, three or more scatter symbols trigger the bonus game. In another embodiment, the fruit may land above the reels so the player achieves the original spin result in addition to the extra scatter symbol from the fruit. In some embodiments, the fruit may drop from the bowl only if the drop would benefit the player (e.g., if one additional scatter symbol is needed to activate another feature).

In an example embodiment, when three trigger symbols appear on the reels of a player's personal play area 806, the free spins bonus game is triggered (described below with reference to FIGS. 15A-15C). The player is subsequently awarded eight free spins. The fruit eventually grows back on the tree. In some embodiments, the fruit may "grow back" on the tree in increasing size and varying degrees of color over a period of time, for example, from a small unripe fruit to a large ripe fruit. In some embodiments, the fruit may "grow back" on the tree by reappearing in its entirety on the tree displayed in communal play area 804. The amount of time for a fruit to grow back on the tree may vary. In some embodiments, the top portion of the tree, as displayed in public play area 810, may always contain one or more fruits. Players may know when a fruit is ready to fall out of the tree when a fruit is present on the bottom portion of the tree, as displayed in private play areas 812.

FIGS. 14A and 14B depict an example bonus game play progression 1400 for an example game instance of a progressive pick bonus game. The progressive pick bonus game is triggered by the bowl explosion feature, as described in FIGS. 12A and 12B. The meters at the top of a player's personal play area 806, are stand-alone progressives with a start-up/reset amount. When a player makes a bet, part of the bet goes into each progressive (increment rate). When the player wins a progressive, the meter associated with the progressive resets to its start-up value plus any remainder (e.g., less than one cent). When the bowl explosion feature triggers the progressive pick bonus game, an animation plays on bottom display device 860 of a player's player station, signaling a transition from the multiplayer base game to the progressive pick bonus game. The progressive pick bonus game is a bonus game separate and distinct from the multiplayer base game. In the progressive pick bonus game, the reels of personal play area 806 may be replaced with a progressive pick area. As shown in first progressive screenshot 1450 (shown in FIG. 14A), the progressive pick area includes a 3×4 grid of gold ingots. In some embodiments, the progressive pick area may include a 3×4 grid of fruit, such as, for example, oranges instead of gold ingots.

In the progressive pick bonus game, a player selects (touches) each of the displayed ingots until three of the same jackpot names (e.g., mini, minor, major, grand) are revealed, as shown in second progressive screenshot 1452. The progressive pick bonus game ends once the player has revealed three matching jackpot names. A "congratulations" message is subsequently displayed in the progressive pick play area, as shown in third progressive screenshot 1454. The "congratulations" message may be displayed after a one or two-second delay. The "congratulations" message may include the matched jackpot name and the win amount. The "congratulations" message may appear for a predefined amount of time, such as, for example, five seconds, before an animation plays on bottom display device 860, transitioning the player back to the reels of the personal play area 806. As shown in fourth progressive screenshot 1456, the progressive jackpot value resets after the player wins a jackpot amount. If a player triggers the progressive pick bonus game and wins the same named jackpot twice in one round of free spins, the first occurrence awards the progressive value and the second occurrence awards the jackpot reset value.

Figure 15A:
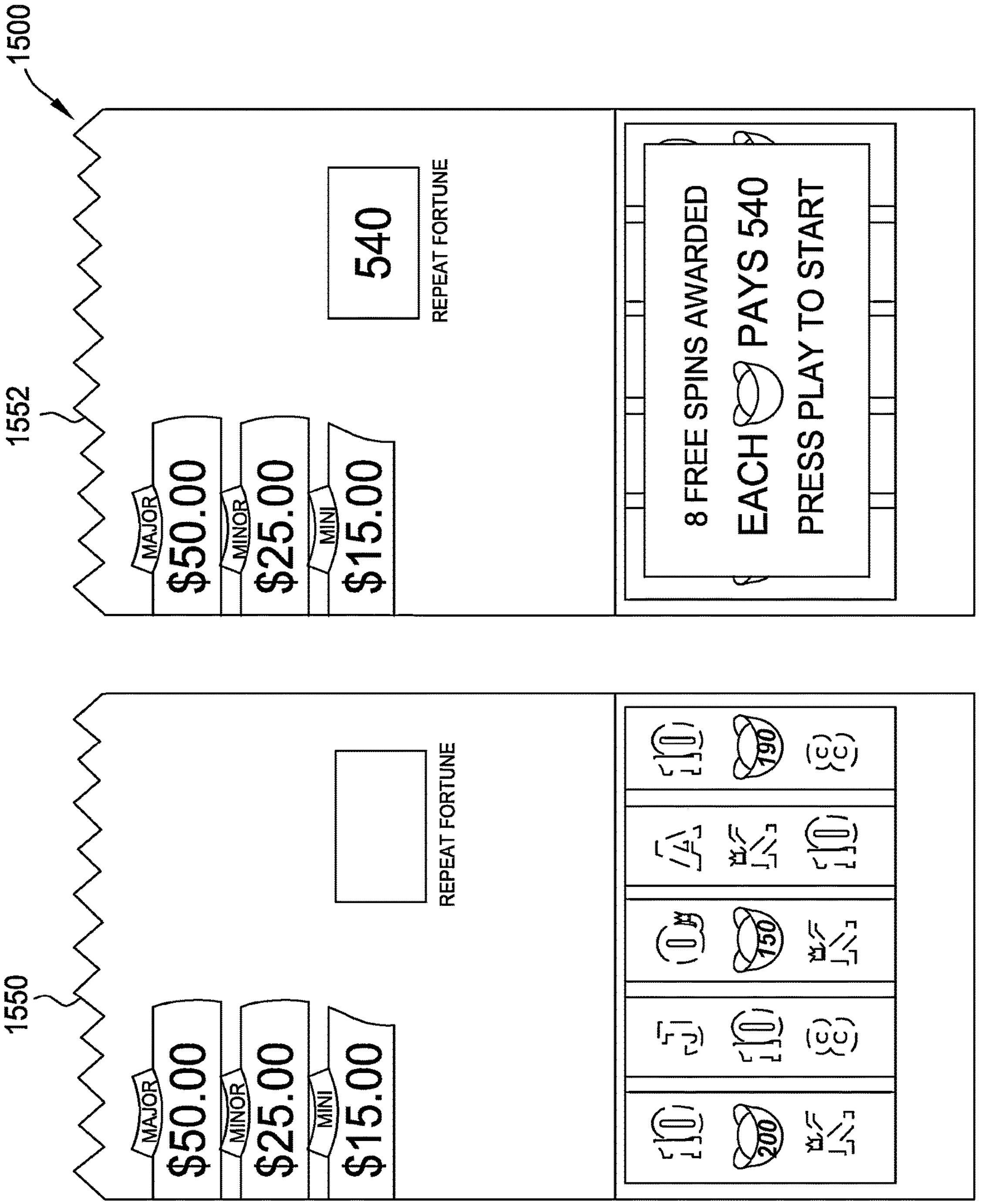
FIGS. 15A, 15B, and 15C are diagrams illustrating game play progression for a free spins bonus game.
Figure 15B:
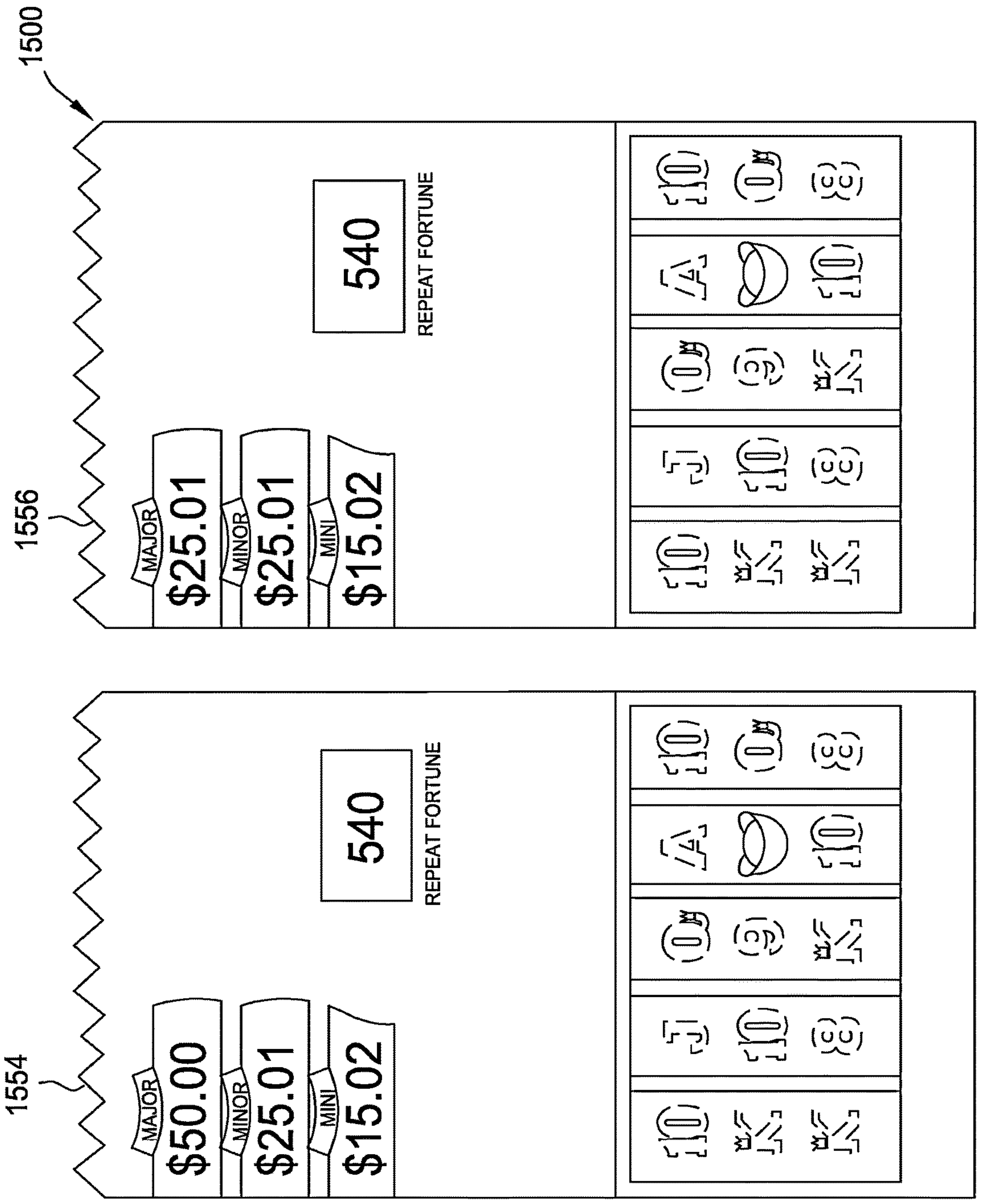
Figure 15C:
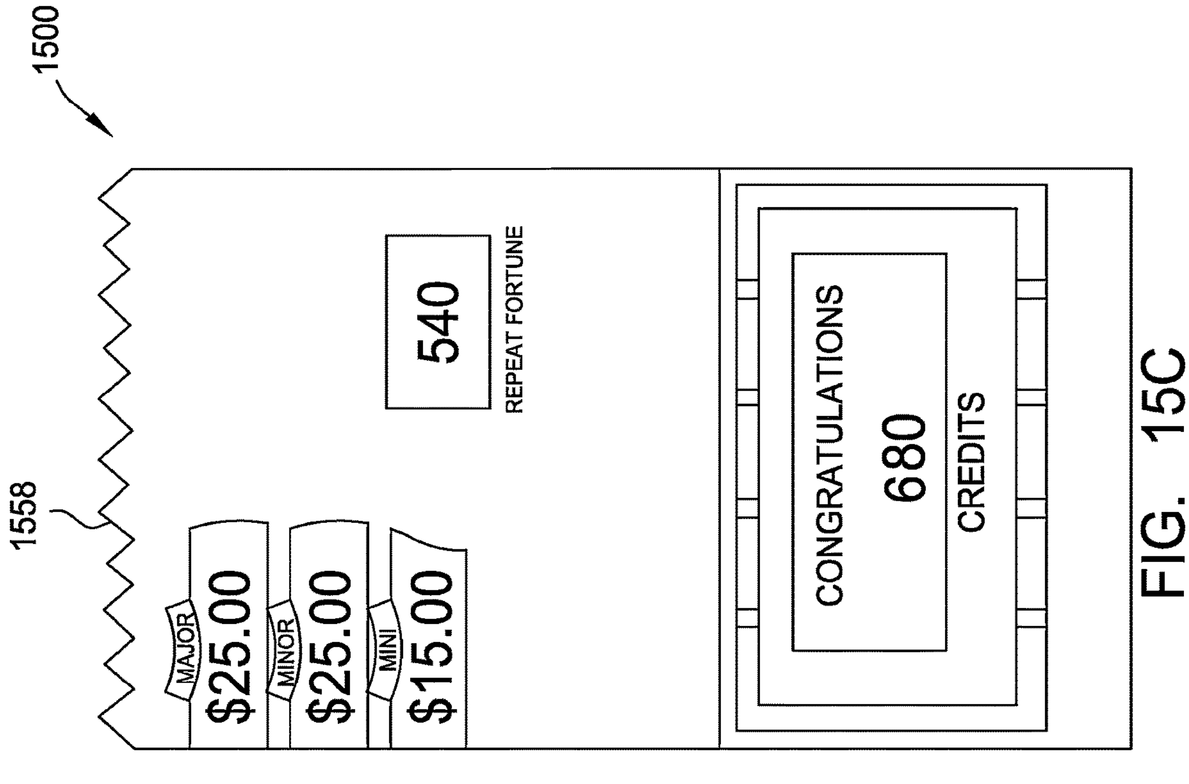

FIGS. 15A-15C depict an example bonus game play progression 1500 for an example game instance of a free spins bonus game. The free spins bonus game may be triggered by the multiplayer fruit feature, as described above in FIG. 13. Additionally or alternatively, the free spins bonus game may also be triggered when three or more scatter symbols appear on the reels of a player's personal play area 806. When three or more scatter symbols appear on the reels, the values accompanying each scatter symbol are added to a "repeat fortune" meter displayed on personal play area 806. The values associated with each scatter symbol may be added to the "repeat fortune" meter one by one, left to right, with an accompanying animation showing that the values are being transferred to the "repeat fortune" meter. When the reels of personal play area 806 spin, a random value is pulled from a table, such as, for example, a bonus game look up table (as described in FIG. 7) to determine if the values will be low, medium, or high. For each scatter symbol within each reel, a random value may be assigned from one or more of the bonus game look up tables associated with the free spins bonus game.

When the free spins bonus game is triggered, an animated sequence plays on bottom display device 860, signaling a transition from the multiplayer base game to the free spins bonus game. The free spins bonus game is a bonus game separate and distinct from the multiplayer base game. In the free spins bonus game, personal play area 806 is replaced with a free spins bonus play area, as shown by screenshots 1550-1558 in FIGS. 15A-15C. As shown in screenshot 1552, upon triggering the free spins bonus game, a start message appears on the free spins bonus play area. The start message indicates the number of free spins awarded, the amount awarded for each trigger symbol, and a "Press Play to Start" message. For example, the start message may provide "8 free spins awarded. Each trigger symbol pays 540. Press play to start." The trigger symbol, as shown by screenshot 1552, is a gold ingot. The trigger symbol is associated with a single award value equal to the value in the "repeat fortune" meter from the triggering spin. The value in the "repeat fortune" meter stays the same throughout the free spins while the win meter (not shown) increments in value with the appearance of each trigger symbol.

In an example embodiment, a player presses a "spin" or "play" button to initiate a round of gameplay and spin the reels of the free spins bonus play area. Once the reels stop, a player is able to view how many trigger symbols appear on the reels, as shown in screenshot 1554 and 1556. The award value associated with each trigger symbol is immediately added to the win meter. When all the free spins are complete, an award celebration message overlays the reels of the free spins bonus play area, as shown in screenshot 1558. The award celebration message indicates the total credits won in the free spins bonus game. The award celebration message may be displayed for a predetermined period of time before automatically transitioning the player back to the player's personal play area 806 of multiplayer base game. In some embodiments, the player cannot tap out of the award celebration message.

Figure 16:
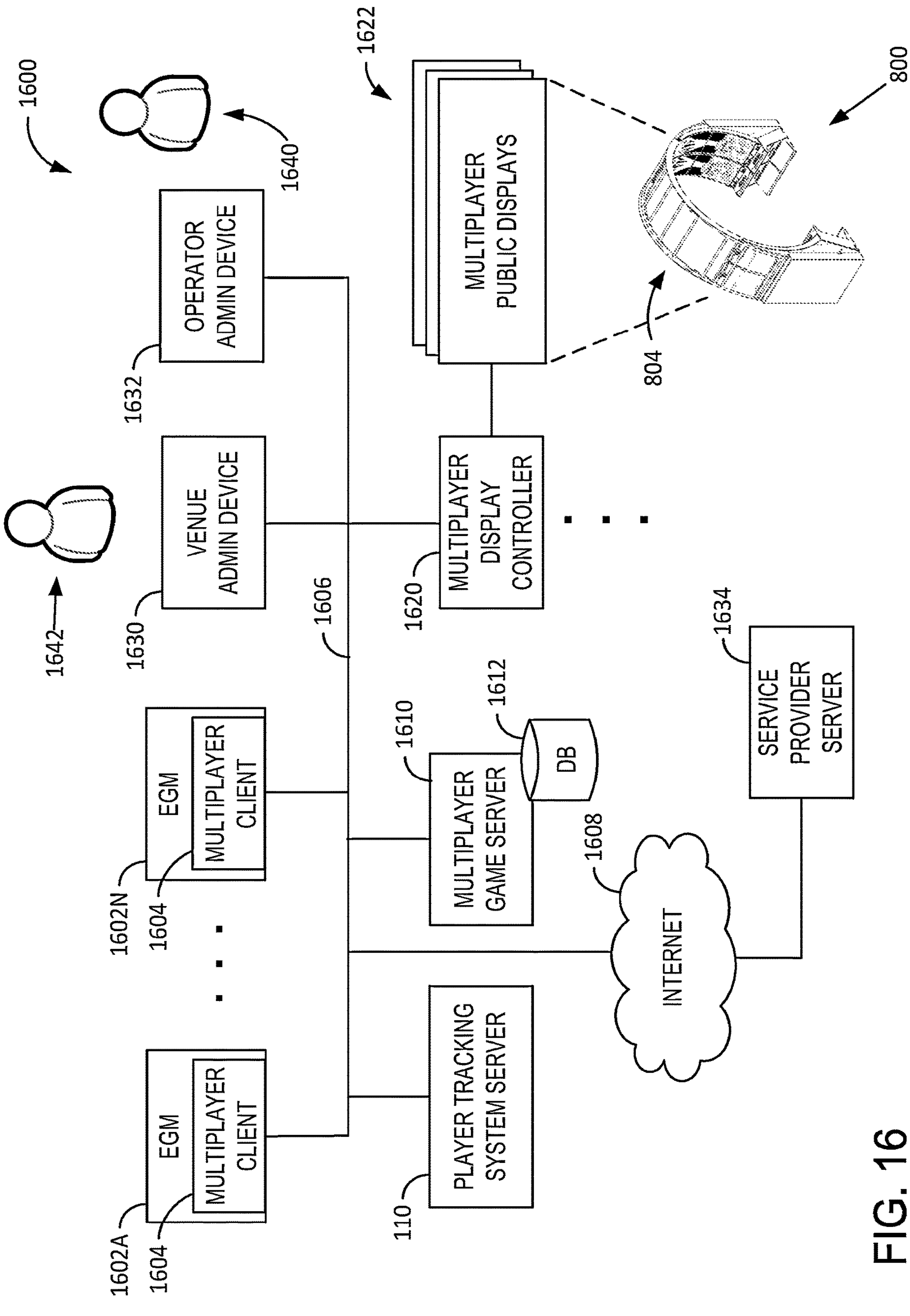
FIG. 16 is an example networked environment of a multiplayer game architecture configured to provide multiplayer game services for wagering games such as the single player stations of the multiplayer gaming environment shown in FIG. 8 and providing the multiplayer game described in FIGS. 9-15C.

FIG. 16 is an example networked environment 1600 of a multiplayer game architecture configured to provide multiplayer game services for wagering games such as the single player stations 852-858 of the multiplayer gaming environment 800 shown in FIG. 8 and providing the multiplayer game described in FIGS. 9-15C. In an example environment, the networked environment 1600 includes the EGMs 1602A-1602N (collectively, "EGMs 1602"), which may be similar to gaming machines 104 (shown in FIG. 1), EGMs 302-308 (shown in FIG. 3), or single player stations 852-858. Each EGM 1602 includes a multiplayer client 1604. Multiplayer gaming services are provided to the EGMs 1602 by a multiplayer game server 1610 including at least one processor (not shown). The multiplayer game server 1610 stores game data (e.g., communal game configuration data, or such) in a game administration database (or just "game admin DB") 1612. The multiplayer game server 1610 provides multiplayer game data that is displayed on one or more multiplayer public displays 1622 (e.g., as the communal play area 804) by a multiplayer display controller 1620. The multiplayer display controller 1620 is configured to present multiplayer game data on the multiplayer public display 1622, allowing nearby players and spectators to witness game play of the multiplayer game and be attracted by the current state of the games. An example of a multiplayer game server 1610 is described in more detail in U.S. patent application Ser. No. 16/588,319, filed Sep. 30, 2019, entitled "SYSTEMS AND METHODS FOR MULTIPLAYER GAMING," which is hereby incorporated herein by reference in its entirety.

In an example embodiment, the multiplayer game architecture provides multiple administrative ("admin") devices, such as an operator admin device 1632 and one or more venue admin devices 1630. The admin devices 1630, 1632 may be used by the operator to configure, administer, track, and audit aspects of the multiplayer game play experience provided by the multiplayer game server 1610. The example multiplayer game architecture provides a tiered administrative architecture that provides an operator (e.g., casino manager or administrative personnel, bar manager) a set of administrative privileges ("operator privileges" of an "operator tier") to view and configure aspects of the multiplayer game play experience offered by the multiplayer game server 1610 while also allowing the operator to delegate certain privileges ("venue privileges" of a "venue tier") to one or more venue personnel 1642 (e.g., floor managers, bar tenders, waiters). The operator admin device 1632 (e.g., a desktop computing device) may provide a dashboard interface ("operator dashboard," not shown) that allows the operator 1640 to configure the multiplayer game server 1610 and to delegate privileges to venue personnel 1642. The venue admin device(s) 1630 may be computing devices (e.g., desktop device, mounted tablet device, mobile device) that are deployed at a venue for easy access by venue personnel 1642 within the venue of a multiplayer game (e.g., within a lounge, near a bank of participating EGMs 1602).

In an example embodiment, the operator dashboard provides various functionalities to the operator 1640. For example, categories of operator privileges include game configuration privileges, accounting privileges, and device configuration privileges. These various privileges are described in greater detail below. Further, the operator dashboard may allow any or all of the various operator privileges to be delegated or additionally permissioned to one or more venue personnel 1642 or venue admin devices 1630.

Game configuration privileges, in an example embodiment, include game play scheduling (e.g., which multiplayer game(s) will be hosted by the multiplayer game server 1610 and timing of such games, timing of premium awards availability, how many multiplayer games are active), game play awards (e.g., adding marketing funds to a prize pool for a multiplayer game or for premium awards, configuring prize pool requirements for participation, adding non-monetary awards such as premium awards to prize pools for a multiplayer game), participation requirements (e.g., require loyalty award member or minimum level, minimum amount of session play or wager amount), marketing configurations (e.g., configuring display parameters for messages presented on the multiplayer public displays 1622 or on participating EGMs 1602, configuring text or images appearing in the communal play area 804, configuring wall promotions or advertisements appearing on the communal play area 804 or on participating EGMs 1602), game play rules (e.g., configuring appearance timing of premium awards, icons to pick for premium awards, configuring game event parameters), and tournament administration (e.g., tournament registration identifying which players or devices will participate, thresholds for participation, creating, managing, stopping and starting tournaments, host controls for tournament announcements, seating assignments).

Device configuration privileges, in an example embodiment, include device enablement (e.g., installing or otherwise enabling multiplayer clients 1604 on particular EGMs 1602, installing particular multiplayer game components on particular EGMs 1602), configuring display control (e.g., which multiplayer displays 622 are assigned to the multiplayer game server 1610, how the multiplayer public displays 1622 may be used or reassigned during game play, what customized messages, artwork or logos appear on the multiplayer displays 1622), server-to-server connectivity (e.g., connecting the multiplayer game server 1610 with other multiplayer game servers for multiplayer game sharing across more gaming devices, venues, or properties), mobile settings (e.g., whether mobile participation is allowed, tethering requirements, white/black listing of particular mobile devices), and venue admin configuration (e.g., registration of particular venue admin devices 1630, operator privilege delegation to particular venue personnel 1642 or particular venue admin devices 1630).

Accounting privileges, in an example embodiment, include game play viewing (e.g., show all players at participating devices, all players currently on play area, vacated player data, game play display), game result viewing (e.g., show game play statistics, award amounts and totals, pool contributions and totals, participation rates and levels, vacated and divested player data, credit transfer for communal wins, calculations for multiplier awards), player proximity viewing (e.g., who is or was near the venue, who has left the venue), and administrative actions auditing (e.g., view game play configuration changes by venue personnel 1642).

In one example embodiment, multiplayer game services may be provided by a service provider server 1634 of a third-party provider ("service provider"). For example, the service provider may administer various multiplayer game services for various venues or operators (e.g., as a service, for an ongoing fee, or such). The service provider server 1634 may perform as the multiplayer game server 1610 for administration and control of the various multiplayer games provided at various venues. As such, the service provider server 1634 may similarly communicate with EGMs 1602 (e.g., receiving events triggering participation in the multiplayer games, transmitting game play data for the multiplayer games to the EGMs 1602 for local display) and multiplayer display controllers 1620 (e.g., for displaying multiplayer game play data on the multiplayer public displays 1622). The service provider server 1634 may provide configuration access to operators 1640 via the operator admin device 1632, venue admin device 1630, or another computing device (e.g., via an API interface), thereby allowing operators or venue personnel 1642 to similarly administer aspects of the multiplayer games. The service provider server 1634 may similarly administer a game play database similar to game play database 1612. In some embodiments, the multiplayer system architecture may provide a third tier of administrative control in which the administration privileges are permissioned to the service provider and the service provider delegates a subset of administrative privileges to the operator. As such, the service provider may facilitate easier administration of the multiplayer games for the operators 1640, who may prefer a low maintenance offering. Further, the service provider may retain certain privileges, such as control over how the multiplayer public displays 1622 are used during operation.

In some embodiments, and as mentioned above, one or more of the EGMs 1602 may additionally or alternatively execute a multiplayer server component (not shown) configured to provide multiplayer game services similar to the multiplayer game server 1610. For example, EGM 1602A may additionally run the multiplayer server component, generate the multiplayer game database 1612, and communicate with other EGMs 1602B-N to administer one or more multiplayer games.

In an example embodiment, the multiplayer game server 1610 administers or otherwise manages one or more prize pools for the multiplayer games being performed by the multiplayer game server 1610. A prize pool is a pool of funds from which awards are given during play of the multiplayer games. A prize pool may be created for each game cycle of a particular game or game instance, or for each type of game, or for each operator or venue. Prize pools may include currency (e.g., dollars (USD, AUD), euros, yen), loyalty points, or other non-currency prizes such as comps (e.g., free drinks, free plays, free services), merchandise (e.g., shirts, jerseys, mugs), or digital content (e.g., additional avatar selections, avatar outfits, background colors or graphics, mobile games). The prize pool may receive deposits from the operator 1640 (e.g., marketing funds to increase player enthusiasm, entries added for various non-currency prizes, prizes provided by third-party advertisers), from EGMs 1602 (e.g., supplemental wager amounts submitted by the players to participate in the multiplayer game, wager portions of primary wagers submitted by the players during primary game play), or directly from players (e.g., purchasing participation in a tournament).

Each multiplayer game instance being provided by the multiplayer game server 1610 may have an associated prize pool, each with a unique prize pool ID. During multiplayer game play, the prize pool attached to a particular multiplayer game instance is used to fund awards provided by the multiplayer game. For example, the multiplayer game and game play progression shown in FIGS. 9-15 may be provided by the multiplayer game server 1610 and may have a prize pool provided by the multiplayer game server 1610. The prize pool may receive incremental deposits from EGMs 1602 during primary game play, seeding the first prize pool with funds as participating players play their primary games. As game play for the multiplayer game rounds provide awards to the participating players, awards are satisfied from the prize pool. In some embodiments, if the amount of funding in the prize pool for a particular multiplayer game cycle is insufficient to cover all of the awards, the multiplayer game server 1610 may be configured to automatically transfer a balance amount from a preconfigured account to cover the shortfall. Awards may be transferred from the prize pool to the winning EGM 1602 (e.g., for players still present at their winning EGM 1602, as credit to their current total) or to a house account of the winning player (e.g., for known loyalty players).

In some embodiments, the multiplayer client 1604 on the EGMs 1602 may provide display functionality for multiplayer game play. For example, the multiplayer game server 1610, or the EGMs 1602 themselves, may generate certain multiplayer game events, such as the communal game elements described above with respect to FIGS. 9-13 (e.g., a coin feature, a bowl explosion feature, an envelope feature, a fruit feature). In an example embodiment, the communal game elements are dictated by the multiplayer game server 1610 or some other type of server. In other embodiments, rather than a server like the multiplayer game server 1610 dictating the communal elements, a master designated EGM provides the communal game elements. The graphical rendering of such an event may involve both changes to the graphical display within the public play area 810 (e.g., an envelope or orange beginning a fall toward a particular player and their EGM 1602), continuing into the private play area 812 of the awarded player, and ending with a displayed effect in the personal play area 806 of the awarded player. The multiplayer display controller 1620 performs display functionality associated with the public play area 810 when a feature is activated. In some embodiments, the multiplayer display controller 1620 may also control and perform display functionality associated with the private play areas 812 of each EGM 1602, where in other embodiments, each EGM 1602 may perform that display functionality (e.g., in configurations where the player stations 852-858 include secondary game displays 242, top display device 862 assigned for use as the private play area 812). Each EGM 1602 performs the display functionality appearing on the personal play area 806 (e.g., on the primary game display 240, bottom display device 860).

In an example embodiment, the different states of a group metamorphic game element, such as, for example, a fortune tree, are controlled by a central server, such as, for example, the multiplayer game server 1610 while the various states of an individual metamorphic game element, such as, for example, a bowl, are controlled by each EGM. In some embodiments, the multiplayer game server 1610 and EGMs 1602 may provide portions of the game processing architecture 700 that are configured to provide aspects of the group metamorphic game. One or more multiplayer UIs 712 could implement the communal game elements (e.g., envelopes and fruits). In one embodiment, the EGM 1602A (e.g., acting as the player station 858) may provide the UI system 702 and the multiplayer game server 1610 may provide the game processing backend system 714 to provide aspects of the multiplayer game. In another embodiment, the multiplayer game server 1610 may provide both the UI system 702 and the game processing backend system 714 for the group metamorphic game elements. In one embodiment, an RNG used to activate a multiplayer feature is an RNG at the multiplayer game server 1610. In another embodiment, the RNG used to activate the multiplayer feature is an RNG at EGMs 1602.

For example, during game play, the player at EGM 1602A may initiate a spin of the base game described with respect to FIGS. 8-15. As a part of the base game, the EGM 1602A is participating in the multiplayer game described in FIGS. 8-15. Upon initiation of a spin, the UI system 702 may generate a first RNG call to the game processing backend system 714 to determine whether a multiplayer feature occurs (e.g., a coin feature, an envelope feature, a fruit feature), which may cause a group metamorphic game element to propagate from the communal play area 804 into the personal play area 806 of EGM 1602A (e.g., coin or orange fall into bowl, cause award to player, or such). When a multiplayer feature with cascading potential (e.g., the coin feature) is activated, the UI system 702 may generate a second RNG call to the game processing backend system 714 to determine whether a cascading feature occurs (e.g., bowl explosion feature). In some embodiments, when a particular multiplayer feature is active for the particular player (e.g., an orange is currently in the bowl), the UI system 702 may generate a third RNG call to the game processing backend system 714 to determine whether additional coins are added to the bowl. After a spin resolution, if an orange is currently in the bowl and if the spin result includes two or more scatter symbols, then the orange may drop into the spin result, thereby adding an additional scatter symbol to the spin result and causing an activation of the free spins bonus game. In some embodiments, if an orange is currently in the bowl and if the spin result includes three or more scatter symbols, one or more of the scatter symbols may be masked with another symbol before the orange from the bowl falls (e.g., reducing the scatter symbol count down to two), thereby making the orange from the bowl appear to be the third and activating scatter symbol.

In some embodiments, the EGM 1602 may include a lighting package (e.g., edge lighting) that is activated by the multiplayer client 1604 or the multiplayer game server 1610 in conjunction with multiplayer game play. For example, in one embodiment, edge lighting may light up whenever a particular EGM 1602 is awarded one of the multiplayer features described above. For example, the edge lighting may flash on the awarded EGM 1602 whenever a multiplayer feature is triggered. In another example, the edge lighting may track a falling object, causing the edge lighting to light up near or adjacent to the fall path as the object traverses the screens down to the awarded EGM 1602. As such, nearby players can more easily see which players activate a multiplayer feature, thereby increasing excitement.

In some embodiments, the multiplayer game server 1610 may administer a "lucky seat" multiplayer feature that may leverage the lighting packages on EGMs 1602. For example, a lucky seat feature may cause the multiplayer game server 1610 to identify one or more EGMs 1602 as the lucky seat for a window of time (e.g., a 2-minute window, a 5-minute window) and activates the lighting package of that lucky seat EGM 1602 during the window (allowing nearby players and spectators to know who is in the lucky seat). In some embodiments, the lucky seat window may be activated by a multiplayer feature activation event on the local EGM 1602. In some embodiments, the lucky seat window may be randomly awarded by identifying one or more EGMs 1602 from a pool of participating EGMs 1602. While the "lucky seat" feature is active for a particular EGM 1602, winnings on that EGM 1602 may be multiplied by a particular multiplier.

In some embodiments, the networked environment 1600 may include multiple multiplayer display controllers 1620 and multiple multiplayer displays 1622. In one embodiment, the multiplayer game server 1610 may cause one multiplayer display controller 1620 and associated multiplayer display 1622 to display a first multiplayer game instance on a bank of EGMs 1602 and a second multiplayer display controller and multiplayer display (not separately shown) to display another multiplayer game instance on another bank of EGMs (not separately shown).

A computer, controller, or server, such as those described herein, includes at least one processor or processing unit and a system memory. The computer, controller, or server typically has at least some form of computer readable non-transitory media. As used herein, the terms "processor" and "computer" and related terms, e.g., "processing device", "computing device", and "controller" are not limited to just those integrated circuits referred to in the art as a computer, but broadly refers to a microcontroller, a microcomputer, a programmable logic controller (PLC), an application specific integrated circuit, and other programmable circuits "configured to" carry out programmable instructions, and these terms are used interchangeably herein. In the embodiments described herein, memory may include, but is not limited to, a computer-readable medium or computer storage media, volatile and nonvolatile media, removable and nonremovable media implemented in any method or technology for storage of information such as computer readable instructions, data structures, program components, or other data. Such memory includes a random access memory (RAM), computer storage media, communication media, and a computer-readable non-volatile medium, such as flash memory. Alternatively, a floppy disk, a compact disc-read only memory (CD-ROM), a magneto-optical disk (MOD), and/or a digital versatile disc (DVD) may also be used. Also, in the embodiments described herein, additional input channels may be, but are not limited to, computer peripherals associated with an operator interface such as a mouse and a keyboard. Alternatively, other computer peripherals may also be used that may include, for example, but not be limited to, a scanner. Furthermore, in the exemplary embodiment, additional output channels may include, but not be limited to, an operator interface monitor.

As indicated above, the process may be embodied in computer software. The computer software could be supplied in a number of ways, for example on a tangible, non-transitory, computer readable storage medium, such as on any nonvolatile memory device (e.g. an EEPROM). Further, different parts of the computer software can be executed by different devices, such as, for example, in a client-server relationship. Persons skilled in the art will appreciate that computer software provides a series of instructions executable by the processor.

While the disclosure has been described with respect to the figures, it will be appreciated that many modifications and changes may be made by those skilled in the art without departing from the spirit of the disclosure. Any variation and derivation from the above description and figures are included in the scope of the present disclosure as defined by the claims.

What is claimed is:

1. A non-transitory computer-readable medium containing instructions embodied thereon which, when executed by at least one processor, causes the at least one processor to:

cause to be displayed, on a multiplayer game display, a group metamorphic game element, wherein the group metamorphic game element includes a plurality of communal game elements, the group metamorphic game element configured to interact with each of a plurality of electronic gaming machines;

cause to be displayed, on a first display of a first electronic gaming machine of the plurality of electronic gaming machines, a first individual metamorphic game element;

activate, during a first game play on the first electronic gaming machine and based on a first output of a random number generator (RNG), a multiplayer feature of a multiplayer game;

in response to said activation, cause the first individual metamorphic game element to transition from the first display to the group metamorphic game element on the multiplayer game display;

cause display of the first individual metamorphic game element interacting with the group metamorphic game element on the multiplayer game display; and cause, in response to the displayed interaction, a first portion of the plurality of communal game elements to transition from the multiplayer game display to the first display of the first electronic gaming machine.

2. The non-transitory computer-readable medium of claim 1, wherein the instructions further cause the at least one processor to cause, in response to the displayed interaction, a second portion of the plurality of communal game elements to transition from the multiplayer game display to a second display of a second electronic gaming machine of the plurality of electronic gaming machines.

3. The non-transitory computer-readable medium of claim 1, wherein the instructions further cause the at least one processor to distribute, in response to transitioning the first individual metamorphic game element to the group metamorphic game element, a grouped award among each of the players of the multiplayer game.

4. The non-transitory computer-readable medium of claim 3, wherein the grouped award is distributed to provide a different award amount to a player at the first electronic gaming machine from the other players of the multiplayer game.

5. The non-transitory computer-readable medium of claim 1, wherein the instructions further cause the at least one processor to activate a cascading feature of the multiplayer feature based on a second output of the RNG received by the at least one processor; and based on the activated cascading feature:

move at least one of the communal game elements from the first display to a second display of a second electronic gaming machine of the plurality of electronic gaming machines; and provide a highest award amount to the first electronic gaming machine based on the first gaming machine causing the activation, and a lower award amount to each other one of the plurality of gaming machines.

6. The non-transitory computer-readable medium of claim 5, wherein the first display and the second display are positioned adjacent to one another.

7. The non-transitory computer-readable medium of claim 1, wherein the multiplayer game display is positioned adjacent to the first game display, and wherein the first individual metamorphic game element follows a continuous path when being transitioned from the first display to the multiplayer game display.

8. The non-transitory computer readable medium of claim 1, wherein the plurality of electronic gaming machines includes a second gaming machine including a second display, the second display being positioned adjacent to the first display and the multiplayer game display.

9. The non-transitory computer readable medium of claim 1, wherein the first individual metamorphic game element includes a firework, and wherein causing the first individual metamorphic game element to transition from the first display to the multiplayer game display includes causing display of the firework launching upwards on the first display and to the group metamorphic game element on the multiplayer game display.

10. The non-transitory computer-readable medium of claim 1, wherein the instructions further cause the at least one processor to dynamically adjust display of the group metamorphic game element and the plurality of communal game elements on the multiplayer game display based on at least one of a determined bank configuration, a form factor of the plurality of electronic gaming machines, and a number of active players.

11. An electronic gaming system comprising:

a plurality of electronic gaming machines;

a multiplayer game display; and at least one processor and at least one memory device with instructions stored thereon that, in response to execution by the at least one processor, cause the at least one processor to:

cause to be displayed, on the multiplayer game display, a group metamorphic game element, wherein the group metamorphic game element includes a plurality of communal game elements, the group metamorphic game element configured to interact with each of the plurality of electronic gaming machines;

cause to be displayed, on a first display of a first electronic gaming machine of the plurality of electronic gaming machines, a first individual metamorphic game element;

activate, during a first game play on the first electronic gaming machine and based on a first output of a random number generator (RNG), a multiplayer feature of a multiplayer game;

in response to said activation, cause the first individual metamorphic game element to transition from the first display to the group metamorphic game element on the multiplayer game display;

cause display of the first individual metamorphic game element interacting with the group metamorphic game element on the multiplayer game display; and cause, in response to the displayed interaction, a first portion of the plurality of communal game elements to transition from the multiplayer game display to the first display of the first electronic gaming machine.

12. The electronic gaming system of claim 11, wherein the instructions further cause the at least one processor to cause, in response to the displayed interaction, a second portion of the plurality of communal game elements to transition from the multiplayer game display to a second display of a second electronic gaming machine of the plurality of electronic gaming machines.

13. The electronic gaming system of claim 11, wherein the instructions further cause the at least one processor to distribute, in response to transitioning the first individual metamorphic game element to the group metamorphic game element, a grouped award among each of the players of the multiplayer game.

14. The electronic gaming system of claim 13, wherein the grouped award is distributed to provide a different award amount to a player at the first electronic gaming machine from the other players of the multiplayer game.

15. The electronic gaming system of claim 11, wherein the multiplayer game display is positioned adjacent to the first game display, and wherein the first individual metamorphic game element follows a continuous path when being transitioned from the first display to the multiplayer game display.

16. The electronic gaming system of claim 11, wherein the plurality of electronic gaming machines includes a second gaming machine including a second display, the second display being positioned adjacent to the first display and the multiplayer game display.

17. The electronic gaming system of claim 11, wherein the instructions further cause the at least one processor to activate a cascading feature of the multiplayer feature based on a second output of the RNG received by the at least one processor; and, based on the activated cascading feature:

move at least one of the communal game elements from the first display to a second display of a second electronic gaming machine of the plurality of electronic gaming machines; and provide a highest award amount to the first electronic gaming machine based on the first gaming machine causing the activation, and a lower award amount to each other one of the plurality of gaming machines, wherein the first display and the second display are positioned adjacent to one another.

18. A method of electronic gaming comprising:

displaying, on a multiplayer game display, a group metamorphic game element, wherein the group metamorphic game element includes a plurality of communal game elements, the group metamorphic game element configured to interact with each of a plurality of electronic gaming machines;

displaying, on a first display of a first electronic gaming machine of the plurality of electronic gaming machines, a first individual metamorphic game element;

activating, during a first game play on the first electronic gaming machine and based on a first output of a random number generator (RNG), a multiplayer feature of a multiplayer game;

in response to said activation, causing the first individual metamorphic game element to transition from the first display to the group metamorphic game element on the multiplayer game display;

displaying the first individual metamorphic game element interacting with the group metamorphic game element on the multiplayer game display; and displaying, in response to the displayed interaction, a first portion of the plurality of communal game elements transitioning from the multiplayer game display to the first display of the first electronic gaming machine.

* * * * *